(12) United States Patent
Murhed et al.

(10) Patent No.: US 12,184,827 B2
(45) Date of Patent: Dec. 31, 2024

(54) METHOD AND ARRANGEMENTS FOR OBTAINING AND ASSOCIATING 2D IMAGE

(71) Applicant: SICK IVP AB, Linköping (SE)

(72) Inventors: Anders Murhed, Linköping (SE); Mattias Johannesson, Linköping (SE)

(73) Assignee: SICK IVP AB, Linköping (SE)

( * ) Notice: Subject to any disclaimer, the term of this patent is extended or adjusted under 35 U.S.C. 154(b) by 63 days.

(21) Appl. No.: 18/156,817

(22) Filed: Jan. 19, 2023

(65) Prior Publication Data

US 2023/0247186 A1 Aug. 3, 2023

(30) Foreign Application Priority Data

Jan. 28, 2022 (EP) ..................................... 22154020

(51) Int. Cl.
*H04N 13/254* (2018.01)
(52) U.S. Cl.
CPC ................................. *H04N 13/254* (2018.05)
(58) Field of Classification Search
CPC ..................................................... H04N 13/254
USPC ......................................................... 348/46
See application file for complete search history.

(56) References Cited

U.S. PATENT DOCUMENTS

| | | | |
|---|---|---|---|
| 6,522,777 B1 | 2/2003 | Paulsen | |
| 10,574,938 B1 | 2/2020 | Trail | |
| 2003/0133129 A1 | 7/2003 | Yagi et al. | |
| 2014/0168368 A1 | 6/2014 | Doucet et al. | |
| 2017/0230641 A1* | 8/2017 | Scavezze | H04N 13/344 |
| 2019/0026877 A1 | 1/2019 | Doge | |
| 2021/0037229 A1 | 2/2021 | Maykol Gomes Pinto et al. | |
| 2021/0048341 A1* | 2/2021 | Johannesson | G01C 3/08 |

FOREIGN PATENT DOCUMENTS

| | | |
|---|---|---|
| JP | 2006261436 | 9/2006 |
| JP | 2012251893 | 12/2012 |
| JP | 2023011042 | 1/2023 |

* cited by examiner

*Primary Examiner* — Amir Shahnami
(74) *Attorney, Agent, or Firm* — DUANE MORRIS LLP; Gregory M. Lefkowitz

(57) ABSTRACT

Method and arrangements for obtaining and associating 2D image data with 3D image data are provided. the image data being based on light triangulation, performed by an imaging system, where a measure object with first light and an image sensor senses reflected first light from a measure object, during a first exposure period resulting in a first image with first intensity peaks occurring at first sensor positions, SP1. The measure object is also illuminated with second light(s) and any reflected second light is sensed from the measure object by the image sensor during third exposure period(s) resulting in one or more third images. For respective first sensor position, SP1, in the first image it is selected a respective third sensor position, SP3, in said one or more third images. It is then obtained 2D image data of respective third sensor position, SP3, in said one or more third images and the obtained 2D image data is associated with the first sensor position, SP1, that the respective third sensor position, SP3, was selected for.

15 Claims, 12 Drawing Sheets

METHOD AND ARRANGEMENTS FOR OBTAINING AND ASSOCIATING 2D IMAGE

TECHNICAL FIELD

Embodiments herein concern a method and arrangements for obtaining and associating 2D image data with 3D image data from light triangulation.

BACKGROUND

Industrial vision cameras and systems for factory and logistic automation may be based on three-dimensional (3D) machine vision, where 3D-images of a scene and/or object are captured. By 3D-images is referred to images that comprise also "height", or "depth", information and not, or at least not only, information, e.g. intensity and/or color, regarding pixels in only two-dimensions (2D) as in a conventional image. That is, each pixel of the image may comprise such information associated with the position of the pixel in the image and that maps to a position of what has been imaged, e.g. the object. Processing may then be applied to extract information on characteristics of the object from the 3D images, i.e. 3D-characteristics of the object, and e.g. convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by so called "sheet of light", e.g. laser-line, 3D triangulation. Laser is often preferred but also other light sources able to provide the "sheet of light" can be used, e.g. light sources able to provide light that stays focused and do not spread out to much, or in other words, light that is "structured", for example light provided by a laser or Light Emitting Diode (LED).

3D machine vision systems are often based on such sheet of light triangulation. In such a system there is a light source illuminating the object with a specific light pattern, such as the sheet of light as the specific light pattern, e.g. resulting in a light, or laser, line on the object and along which line 3D characteristics of the object can be captured, corresponding to a profile of the object. By scanning the object with such a line, i.e. performing a line scan, involving movement of the line and/or object, 3D characteristics of the whole object can be captured, corresponding to multiple profiles.

3D machine vision systems or devices that use a sheet of light for triangulation may be referred to as systems or devices for 3D imaging based on light, or sheet of light, triangulation, or simply laser triangulation when laser light is used.

Typically, to produce a 3D-image based on light triangulation, reflected light from an object to be imaged is captured by an image sensor of a camera and intensity peaks are detected in the image data. The peaks occur at positions corresponding to locations on the imaged object with the incident light, e.g. corresponding to a laser line, that was reflected from the object. The position in the image of a detected peak will map to a position on the object from where the light resulting in the peak was reflected.

A laser triangulating camera system, i.e. an imaging system based on light triangulation, projects a laser line onto an object to create height curves from the surface of the target object. By moving the object relative to the cameras and light sources involved, information on height curves from different parts of the object can be captured by images and then combined and used with knowledge of relevant geometries of the system to produce a three dimensional representation of the object, i.e. 3D image data is provided. This technique may be described as grabbing of images of the light, typically a laser line, when it is projected onto and reflected by the object and then in the images extract positions of the reflected laser line. This is normally accomplished by identifying positions of intensity peaks in the image frames e.g. using a conventional peak finding algorithm. Typically but not necessary the imaging system is setup so that intensity peaks can be searched for per column of the sensor and the position within the column maps to a height or depth.

In many applications it is desirable to not only get 3D image data, such as height and dept of an object, but also conventional 2D image data of the object, e.g. in order to provide a texture to a 3D model of the object formed from the 3D image data so that the model can be made to look like the real world object. Additionally or alternatively it is of interest to get certain 2D information from the surface of the object, e.g. for quality assurance reasons. It may be of particular interest to get such information for the same positions as the 3D image data, i.e. so the 2D image data is for and/or aligned with 3D positions that correspond to actual position on the object that both the 3D image data and 2D image data was captured from. In the light triangulation case it is thus of interest to get 2D image data associated with the intensity peak positions. With 2D image data associated with 3D image data positions it is for example possible to analyze a 2D image surface of a 3D model of an object to identify e.g. text, scratches, marks, and/or color variations etc., and be able to identify where on an actual object these are located, if they are also associated with height variations etc. For example, scratches of certain type on certain locations may be more critical than on other locations. Objects with problematic scratches may be marked up and/or sorted out and/or have the scratches fixed.

Greyscale 2D image data from reflectance and intensity can be obtained e.g. using the same light, e.g. laser, as used in the light triangulation to provide the 3D image data. However, in the laser case, often so-called speckle noise occurs then occur in the 2D image, due to the special properties of the laser light. Also, it can be realized that the 2D information that can be obtained this way from the surface of an object is quite limited.

SUMMARY

In view of the above, an object is to provide one or more improvements or alternatives to the prior art, such as providing an improved way of how 2D image data can be associated with 3D image data resulting from light triangulation.

According to a first aspect of embodiments herein, the object is achieved by a method for obtaining and associating 2D image data with 3D image data. The 3D image data being based on first intensity peak positions resulting from light triangulation performed by an imaging system comprising a first light source for illuminating a measure object with first light and an image sensor for sensing reflected first light from the measure object. Said light triangulation comprises, as conventionally, to illuminate a first portion of the measure object with the first light and sense reflected first light from the first portion by the image sensor during a first exposure period (EXP1) resulting in a first image (IM1) with first intensity peaks occurring at first sensor positions (SP1) and to illuminate another, second, portion of the measure object adjacent to said first portion with the first light and sense reflected first light from the second portion by the image sensor during another, second exposure period (EXP2) resulting in a second image with second intensity peaks occurring at second sensor positions (SP2). The imaging system further comprises one or more additional, second, light sources for illuminating the measure object with one or more second lights.

The method comprises to illuminate the measure object with said one or more second lights and sense any reflected second light from the measure object by the image sensor during one or more third exposure periods (EXP3) resulting in one or more third images (IM3).

The method further comprises to select, for respective SP1 in IM1, a respective third sensor position (SP3) in said IM3 and to provide said illumination with the one or more second lights such that during said EXP3, any reflected second light from the measure object will result in higher intensity than reflected first light in the selected SP3.

Moreover, the method comprises to obtain 2D image data of respective selected SP3 in said IM3 and to associate the obtained 2D image data with the SP1 that the respective selected SP3 was selected for, whereby the obtained 2D image data become associated with the 3D image data.

According to a second aspect of embodiments herein, the object is achieved by a computer program comprising instructions that when executed by one or more processors causes one or more devices to perform the method according to the first aspect.

According to a third aspect of embodiments herein, the object is achieved by a carrier comprising the computer program according to the second aspect.

According to a fourth aspect of embodiments herein, the object is achieved by one or more devices for obtaining and associating 2D image data with 3D image data. The 3D image data being based on first intensity peak positions resulting from light triangulation performed by an imaging system comprising a first light source for illuminating a measure object with first light and an image sensor for sensing reflected first light from the measure object. Said light triangulation comprises, as conventionally, to illuminate a first portion of the measure object with the first light and sense reflected first light from the first portion by the image sensor during a first exposure period (EXP1) resulting in a first image (IM1) with first intensity peaks occurring at first sensor positions (SP1) and to illuminate another, second, portion of the measure object adjacent to said first portion with the first light and sense reflected first light from the second portion by the image sensor during another, second exposure period (EXP2) resulting in a second image with second intensity peaks occurring at second sensor positions (SP2). The imaging system further comprises one or more additional, second, light sources for illuminating the measure object with one or more second lights.

Said device(s) are configured to illuminate the measure object with said one or more second lights and sense any reflected second light from the measure object by the image sensor during one or more third exposure periods (EXP3) resulting in one or more third images (IM3).

Said device(s) are further configured to select, for respective SP1 in IM1, a respective third sensor position (SP3) in said IM3 and to provide said illumination with the one or more second lights such that during said EXP3, any reflected second light from the measure object will result in higher intensity than reflected first light in the selected SP3.

Moreover, said device(s) are configured to obtain 2D image data of respective selected SP3 in said IM3 and to associate the obtained 2D image data with the SP1 that the respective selected SP3 was selected for, whereby the obtained 2D image data become associated with the 3D image data.

Embodiments herein enable provision of 2D image data associated with and aligned on a sensor position, or pixel, level with 3D image data from the light triangulation. This without being limited to obtain the 2D image data from illumination by the same light source used to obtain the 3D image data. As a result, a greater variety of 2D image data can be obtained, e.g. based on using different kind of light sources and/or illumination, including illumination from different positions and directions.

In some embodiments, the 2D image data can be obtained from the same image frame and exposure as the associated 3D image data, and in some embodiments from a separate exposure and separate, but related, image frame, utilizing the time period between subsequent image frames from the light triangulation. Said embodiments with the same image frame and exposure enable less data processing and facilitate implementation with existing systems, while said embodiments with separate exposure and image frame for the 2D data enable alternate kind of illumination and thus more kinds of 2D image data, and thereby also support more applications.

Embodiments herein for example enable:
2D image data based on reflectance without speckle noise in laser triangulation based 3D imaging systems,
2D image data based on reflectance from alternate light source geometries in light triangulation based 3D imaging systems, and improved detection of surface defects in 2D image data based on reflectance and that is aligned with and e.g. registered with 3D image data from light triangulation.

BRIEF DESCRIPTION OF THE DRAWINGS

Examples of embodiments herein are described in more detail with reference to the appended schematic drawings, which are briefly described in the following.

FIG. 1 schematically illustrates an example of a prior art imaging system that also embodiments herein can use and/or be based on.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

When the light triangulation light source, typically laser, is used for obtaining reflectance images, i.e. image based on 2D data of a measure object, disadvantages include speckle noise in the image and no possibility to gather alternate surface information than possible from the light used in the light triangulation.

On the other hand, if images of the measure object are obtained separate from the light triangulation, it is very difficult if at all possible in all application to get a desirable alignment with a 3D image of the measure object as resulting from the light triangulation.

A "multi scan" approach may be used where e.g. a separate row or rows of an imager, i.e. the image sensor used, can be used to gather 2D image data but this is still without any good alignment with the 3D image data, and a resampling process is needed. Furthermore, it is difficult to create good focus for both the light triangulation, that most of the imager is used for, and the separate 2D image data readout. A light triangulation setup will typically have maximum focus only around the laser plane using Scheimpflug focusing and the ability and desire to use a large aperture opening to allow more light to reach the imager.

It would thus be desirable with a way to obtain 2D image data that is not limited to using the light used in the light triangulation as such and at the same time be able to get 2D image data well aligned with 3D image data from the light triangulation.

Embodiments herein relate to a solution for the above.

Figure 1:
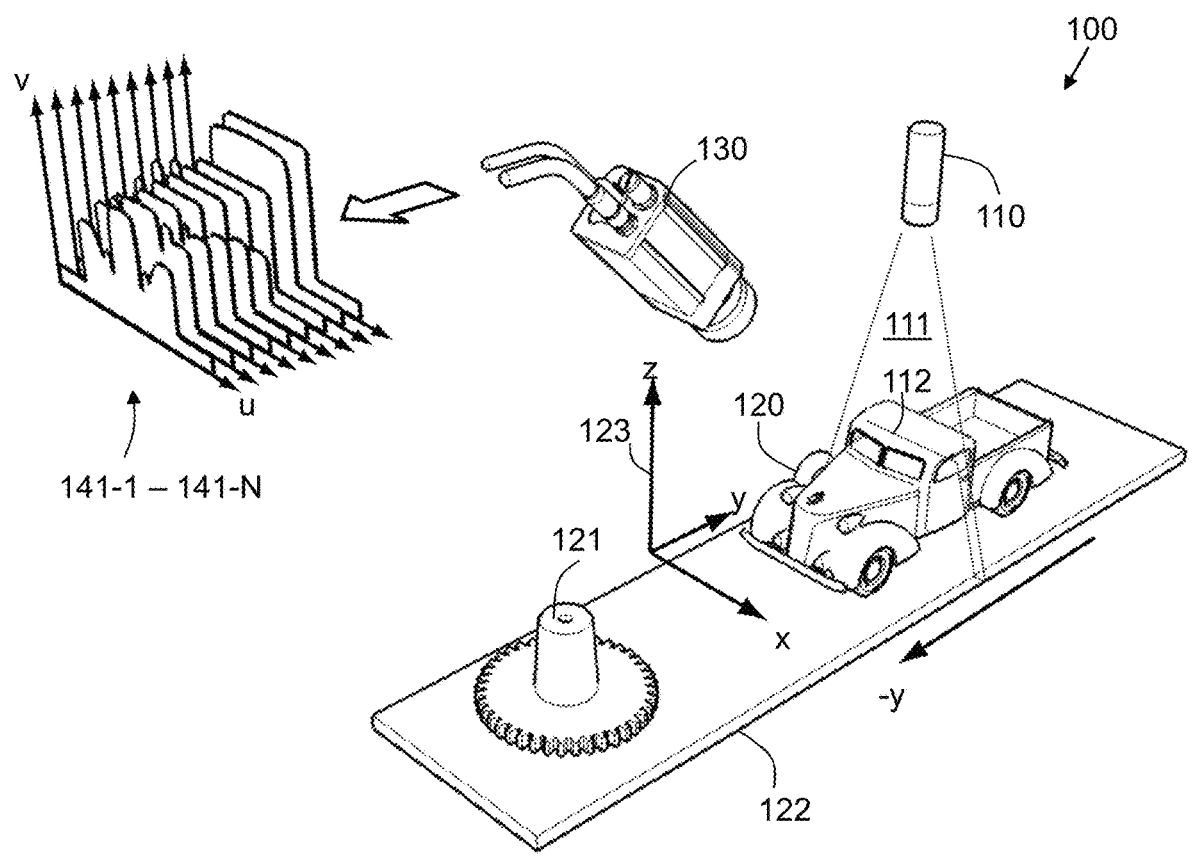

FIG. 1 schematically illustrates an example of such type of imaging system as mentioned in the Background, namely an imaging system 100, for 3D machine vision, based on light triangulation for capturing information on 3D characteristics of target objects. The system can be used for providing images that embodiments herein, described further below, can operate on. The system 100 is in the figure shown in a situation of normal operation, i.e. typically after calibration has been performed and the system is thus calibrated. The system 100 is configured to perform light triangulation, here in the form of sheet of light triangulation as mentioned in the Background. The system 100 further comprises a light source 110, e.g. a laser, for illuminating objects to be imaged with a specific light pattern 111, in the figure exemplified and illustrated as a sheet of light. The light may, but not need to be, laser light. In the shown example, the target objects are exemplified by a first measure object 120 in the form of a car and a second measure object 121 in the form of a gear wheel construction. When the specific light pattern 111 is incident on an object, this corresponds to a projection of the specific light pattern 111 on the object, which may be viewed upon as the specific light pattern 111 intersects the object. For example, in the shown example, the specific light pattern 111 exemplified as the sheet of light, results in a light line 112 on the first measure object 120. The specific light pattern 111 is reflected by the object, more specifically by portions of the object at the intersection, i.e. at the light line 112 in the shown example. The measuring system 100 further comprises a camera 130 comprising an image sensor (not shown in FIG. 1). the camera and image sensor are arranged in relation to the light source 110 and the objects to be imaged so that the specific light pattern, when reflected by the objects, become incident light on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the specific light pattern 111 will at the light line 112 on a portion of the car roof of the first measure object 120 be reflected towards the camera 130 and image sensor, which thereby may produce and provide image data with information about said portion of the car roof. With knowledge of the geometry of the measuring system 100, e.g. how image sensor coordinates relate to world coordinates, such as coordinates of a coordinate system 123, e.g. Cartesian, relevant for the object being imaged and its context, the image data may be converted to information on 3D characteristics, e.g. a 3D shape or profile, of the object being imaged in a suitable format. The information on said 3D characteristics, e.g. said 3D shape(s) or profile(s), may comprise data describing 3D characteristics in any suitable format.

By moving e.g. the light source 110 and/or the object to be imaged, such as the first measure object 120 or the second object 121, so that multiple portions of the object are illuminated and cause reflected light upon the image sensor, in practice typically by scanning the objects, image data describing a more complete 3D shape of the object may be produced, e.g. corresponding to multiple, consecutive, profiles of the object, such as the shown profile images 140-1-140-N of the first measure object 120, where each profile image shows a contour of the first object 120 where the specific light pattern 111 was reflected when the image sensor of the camera unit 130 sensed the light resulting in the profile image. As indicated in the figure, a conveyor belt 122 or similar may be used to move the objects through the specific light pattern 112, with the light source 110 and the camera unit 130 typically stationary, or the specific light pattern 111 and/or the camera 130 may be moved over the object, so that all portions of the object, or at least all portions facing the light source 110, are illuminated and the camera receives light reflected from all parts of the object desirable to image.

As understood from the above, an image frame provided by the camera 130 and its image sensor, e.g. of the first measure object 120, may correspond to any one of the profile images 140-1-140-N. As mentioned in the Background, each position of the contour of the first object shown in any of the profile images 140-1-140-N are typically determined based on identification of intensity peaks in image data captured by the image sensor and on finding the positions of these intensity peaks. The system 100 and conventional peak finding algorithms are typically configured to in each image frame search for an intensity peak per pixel column. If sensor coordinates are u, v and for example u, as indicted in the figure, corresponds to pixel positions along rows in the image sensor and v corresponds to pixel positions along columns, there is for each position u of an image frame searched for peak position along v and the identified peaks in an image frame may result in one such clean profile image as shown in the figure, and the total of image frames and profile images can be used to create a 3D image of the first object 120.

Figure 2A:
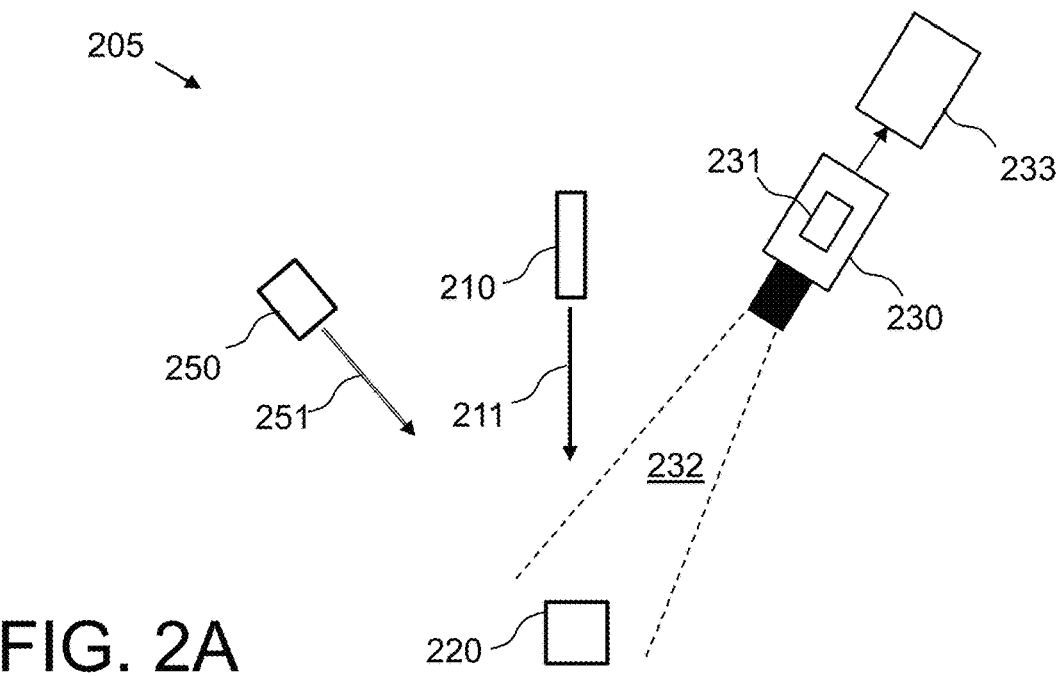
FIG. 2A schematically illustrates an simplified example of a an imaging system that can be configured to carry out embodiments herein.

FIG. 2A schematically illustrates a simplified first example of a an imaging system 205 that can be configured to carry out embodiments herein, i.e is for implementing embodiments herein. The imaging system 205 is based on light triangulation for capturing information on 2D and 3D characteristics of one or more measure objects. The shown system corresponds to a basic configuration and comprises: A first light source 210 for illuminating a measure object 220 with first light 211, typically laser light, as part of light triangulation for 3D imaging of the measure object 220. A second light source 250 for illuminating the measure object 220 with second light 251 for 2D imaging of the measure object 220. A camera 230 with image sensor 231 arranged for sensing reflected first light from the measure object 220 as part of said light triangulation for the 3D imaging, and for sensing reflected second light from the measure object 220 for said 2D imaging.

The camera 230, image sensor 213 and first light source 210 are configured and positioned in relation to each other for light triangulation. The system 205 may for the light triangulation purpose correspond to the system 100 in FIG. 1, i.e. regarding the first light source 210, the camera 230, the image sensor 231, how they are positioned in relation to each other and the measure object 220 etc., but additionally configured to perform according to embodiments herein and as described further below. The image sensor 231 should of course also be sensitive to the second light but this will typically be the case for all conventional image sensors used for light triangulation.

Hence: The measure object 220 may correspond to the first measure object 120 and is shown located at least partly within field of view 232 of the camera 230. The first light source 210 is configured to illuminate the measure object 220 with the first light 211, typically in the form of structured light, such as a specific light pattern, for example a sheet of light and/or a light, such as laser, line, that is reflected by the measure object 220 and the reflected first light is captured by the camera 230 and image sensor 231. Another example of structured light that can be used as the first light is a light edge, i.e. an edge of an area or portion with illumination. The measure object 220 may thus be illuminated and images may be captured as in conventional light triangulation. Said light triangulation as such may thus be as in the prior art and involve movement of the first light source 210 and/or the measure object 220 in relation to each other, so that at different consecutive time instants, different consecutive portions of the measure object 220 are illuminated by the first light source 210 and the first light 211. Reflected first light 211 from the measure object 220 is sensed by the image sensor 231. In light triangulation, typically, but not necessary, the camera 230 and first light source 210 are fixed in relation to each other and the measure object 220 move in relation to these. Through said sensing by the image sensor 231, a respective image frame is associated with a respective time instant of when the image frame was sensed, i.e. captured, and with a respective portion of the measure object 220 from which the image sensor 331 sensed reflected first light 211 at the respective time instant.

The camera 230 may be a prior art camera, e.g. correspond to the camera 130 in the system 100 of FIG. 1 and the image sensor 231 may be the same or similar image sensor discussed above in relation to FIG. 1. Image frames and/or information derived from image frames provided by the camera 230 and the image sensor 231 may be desirable to transfer, e.g. transmit, for further processing outside the camera 330, e.g. to a computing device 233, such as a computer or similar. Such further processing may additionally or alternatively be performed by a separate computing unit or device (not shown), i.e. separate from the image processor 231, but still comprised in, e.g. integrated with, the camera 230, or a unit comprising the camera 230. The computing device 233, e.g. computer, or another device (not shown) may be configured to control devices involved in the light triangulation and/or involved in embodiments herein, so that the light triangulation and/or other actions relating to embodiments herein are performed.

The first light source 110 and the camera 230 are typically arranged at predetermined fixed positions and with known relations to each other for the light triangulation. The second light source 250 may also be at fix position in relation to the camera 230 and first light source 210 but exact position and relation to the camera 230 and image sensor 231 is not utilized as in light triangulation for embodiments herein and the second light source can thus be arranged more freely with the purpose to provide the second light and illumination according to various embodiments herein as described further below.

Figure 2B:
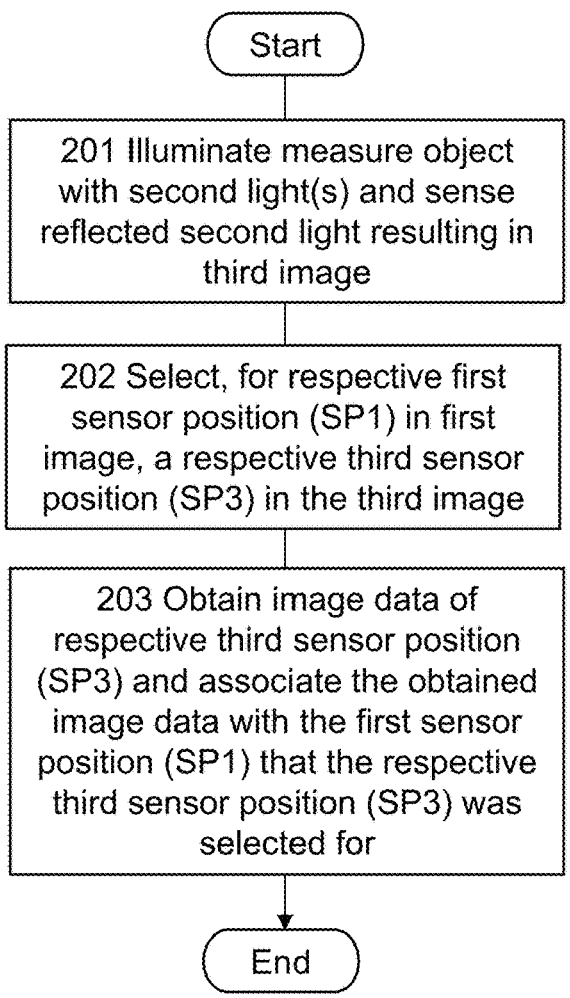
FIG. 2B is a flowchart for schematically illustrating embodiments of a method according to embodiments herein.

FIG. 2B is a flowchart for schematically illustrating embodiments of a method according to embodiments herein. The actions below, which may form the method, are for obtaining and associating 2D image data with 3D image data. The 3D image data being based on first intensity peak positions resulting from light triangulation performed by an imaging system, e.g. the imaging system 205. The first intensity peak positions may thus be intensity peak positions as determined in conventional light triangulation. They are explained and exemplified in relation to embodiments herein further below and in separate drawings and examples. The imaging system comprises a first light source for illuminating a measure object with first light and an image sensor for sensing reflected first light from the measure object. In the following, the first light source and first light may be exemplified by the first light source 210 and first light 211, and the measure object and the image sensor may be exemplified by the measure object 220 and the image sensor 231.

As in conventional light triangulation, the light triangulation comprises:

To illuminate a first portion of the measure object 220 with the first light 211 and sense reflected first light from the first portion by the image sensor 231 during a first exposure period resulting in a first image (IM1) with first intensity peaks occurring at first sensor positions (SP1).

To illuminate another, second, portion of the measure object 220 adjacent to said first potion with the first light 211 and sense reflected first light from the second portion by the image sensor 231 during a another, second, exposure period (EXP2) resulting in a second image (IM2) with second intensity peaks occurring at second sensor positions (SP2).

The first and second images thus correspond to consecutive image frames, with intensity peaks, used for the light triangulation.

Said exposure periods, images, sensor positions, SP1 and SP2, are explained and exemplified further below and in separate drawings and examples.

Moreover, the imaging system, e.g. the imaging system 205, further comprises one or more additional, second, light sources for illuminating the measure object 220, preferably with one or more second lights different than said first light. In the following, the second light source(s) and second light(s) may be exemplified by the second light source 250 and second light 251. Explanation, further examples and details about second light sources and second lights are provided below and in separate drawings and examples.

The method and/or actions below and indicated in FIG. 2B may be performed by device(s), i.e. one or more devices, such as the camera 230 and/or the computing device 233, or by the imaging system 205 and/or suitable device(s) thereof or connected to it. Device(s) for performing the method and actions thereof are further described below.

Note that the actions below may be taken in any suitable order and/or be carried out fully or partly overlapping in time when this is possible and suitable.

Action 201

The measure object 220 is illuminated with said one or more second lights 251 and it is sensed any reflected second light from the measure object 220 by the image sensor 231 during one or more third exposure periods (EXP3) resulting in one or more third images (IM3), respectively.

The illumination may be provided so that during the first exposure period (EXP1), any reflected second light will result in lower intensity than intensity from reflected first light in the first sensor positions (SP1) and the second sensor positions (SP2). This makes sure second light interference of the first light intensity peaks is kept low, and is further explained and exemplified below in relation to FIGS. 4A-D.

The images IM1-3 and exposure periods EXP1-3 are explained and discussed below in relation to FIGS. 3A-B for two main groups of embodiments, respectively.

Action 202

It is, for respective first sensor position (SP1) in the first image, selected a respective third sensor position (SP3) in said one or more third images (IM3) and said illumination with the one or more second lights 251 may be provided such that during said one or more third exposure periods (EXP3), any reflected second light from the measure object 220 will result in higher intensity than reflected first light 211 in the selected third sensor positions (SP3). This makes sure that the reflected second light is not obscured and/or is undesirably interfered by reflected first light in SP3.

In some embodiments, the third sensor positions (SP3) are selected with a predefined or predetermined relation to the first sensor positions (SP1) that result from the light triangulation. It may e.g. be predetermined that a respective SP3 shall be selected with a predetermined relation to a respective SP1, such as at a predetermined distance and/or in a predetermined direction from the respective SP1. For example that respective SP3 is to be selected a predetermined number of pixels from, or be a pixel or position at a predetermined distance from, the respective SP1. The predetermined direction may correspond to a scan direction applied for the light triangulation, i.e. be a direction on the image sensor that maps to the scan direction. For example, as in the shown examples herein with a x,y,z real world coordinate system and u, v sensor coordinates, a scan direction along y maps to a direction along v on the image sensor 231. The predefined or predetermined direction could also be described as a direction corresponding to the direction where the first light intensity, with intensity peaks in SP1, has closest and/or greatest decrease when moving away from SP1, or that it is a first light intensity gradient direction from SP1 and the intensity peak there.

The sensor positions SP1-3, including selection of the third sensor position SP3 and what differs between said two main groups of embodiments, are further explained and exemplified below in relation to FIGS. 4A-D.

Action 203

It is obtained 2D image data from respective third sensor position (SP3) in said one or more third images, i.e. the third sensor positions as selected in Action 202, and the obtained image data is associated with the first sensor position (SP1) that the respective third sensor position (SP3) was selected for. As a result, since the 3D image data from the light triangulation is based on the first intensity peak positions in the first sensor positions (SP1), the obtained 2D image data becomes associated with the 3D image data.

As used herein, "2D image data" refers to image data in positions or pixels of an image sensor, e.g. the image sensor 231, resulting from exposure to light, or in corresponding positions in an image generated by the image sensor. The 2D image data is typically corresponding to light intensity and/or color. For embodiments herein, the 2D image data of a certain position or pixel comprise information about a corresponding position on the measure object that reflected the second light(s), i.e. the 2D image data of a certain position corresponds to image data with information about how a corresponding position of the imaged measure object reflects the second light(s).

As used herein, "3D image data based on an intensity peak position resulting from light triangulation" should be understood as data that comprise at least depth information in relation to the image sensor about a corresponding position on the measure object that reflected the first light resulting in said intensity peak position. For example, for the profile images 141-1 . . . 141-N shown in relation to FIG. 1, with identified intensity peak positions shown in sensor coordinates u, v, the intensity peak position v for each position u comprises information about depth of the imaged object 120, more specifically depth information about the position on the object 120 that reflected the light 112 resulting in the intensity peak position v.

In practice, 3D image data regarding a position on the measure object that reflected the first light may be a 3D position of an intensity peak position in u,v,t that maps to a position in x, y, z on the measure object, or it may be a corresponding 3D position in coordinates x',y',z' of a 3D model of the measure object, which model has been provided from computation based on u,v,t and known operation conditions and relations used in the light triangulation.

Embodiments herein thus relate to provision of 2D image data associated with 3D image data from light triangulation. The 2D image data is relevant for the same position on the measure object that the 3D image data come from since the 2D image data, as explained above and further explained and exemplified below, is obtained in relation to and preferably in connection with obtaining image frames with the first intensity peaks used for the light triangulation, and by using the same image sensor, but without being limited to obtain the 2D image data from illumination by the same light source as used to obtain the 3D image data. As a result, a great variety of 2D image data associated with 3D image data can be obtained, e.g. based on using different kind of light and/or illumination, including illumination from different directions and positions, as also will be further discussed separately below.

The second light 251, or lights, for example in embodiments with several second light sources, is/are advantageously diffuse, at least some of second lights, and/or may be provided by LED(s), that the second light source 250 thus may be based on. That is, at least one of second light sources may provide diffuse second light. Diffuse light is in contrast to the first light 111 that typically is very directional, such as laser light. Diffuse light enable reflectance without laser speckles. Another advantage with diffuse second light(s) is simpler system setup, easier to accomplish suitable intensity at SP3 and also at SP1. Diffuse light is also closer to normally occurring illumination and may therefore be better to capture desired 2D image data about the measure object. Some embodiments may also become simpler to implement with diffuse second light(s).

Figure 3A:
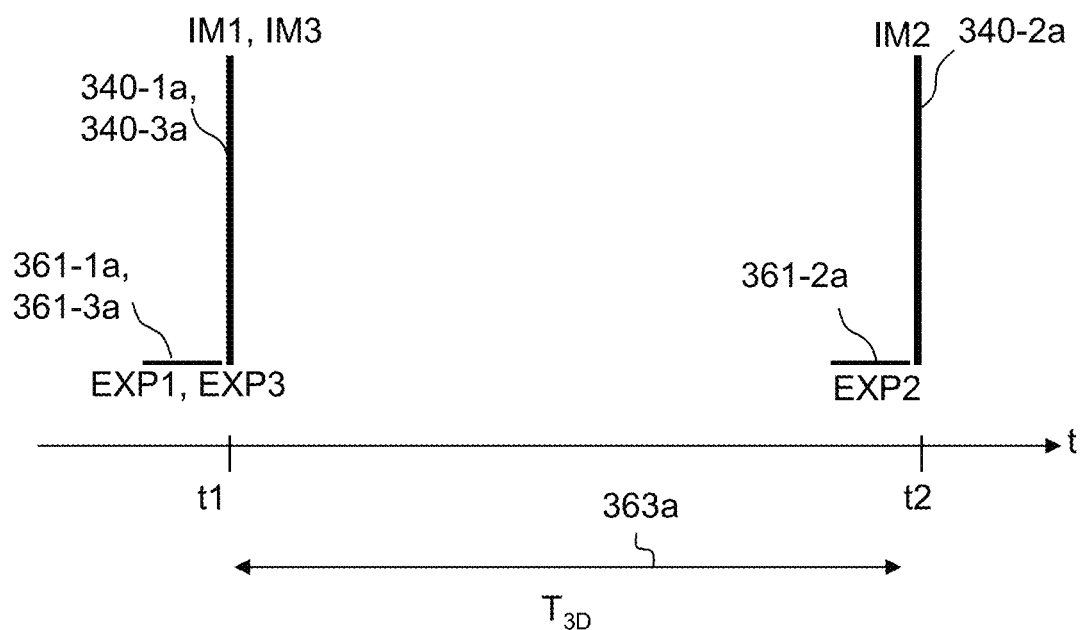
FIGS. 3A-B schematically illustrates situations for two main sub-groups of embodiments herein, respectively.
Figure 3B:
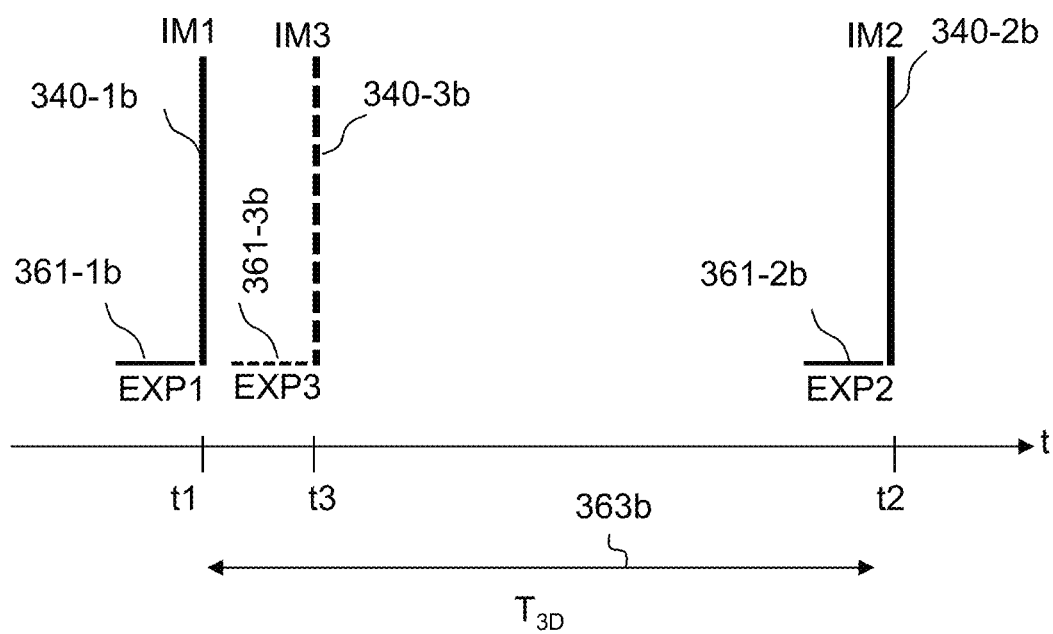

FIGS. 3A-B schematically illustrates situations for two main sub-groups of embodiments herein, respectively, to the method described above in relation to FIG. 2B. In short: FIG. 3A is about a first main sub-group of embodiments where said third image (IM3) is the same as the first image (IM1) and thus the third exposure period (EXP3) is the same as the first exposure period (EXP1). FIG. 3B is instead about a second main sub-group of embodiments where third image (IM3) is separata from the first image (IM1), and the second image (IM2), and where the third exposure period (EXP3) is a new, separate exposure period, after the first exposure period (EXP1), more specifically between EXP1 and EXP2, and IM3 is thus between IM1 and IM2 in time, i.e. between images used for the light triangulation.

FIG. 3A more specifically and schematically shows a third exposure period 361-3a, corresponding to EXP3, that is the same as a first exposure period 361-1a corresponding to EXP1. It is also shown a third image 340-3a, corresponding to IM3, that thus is the same image as a first image 340-1a corresponding to IM1. It is also shown a second image 340-2a corresponding to IM2 with a second exposure period 381-2a corresponding to EXP2. The shown images IM1 and IM2 thus correspond to images used for the light triangulation. The first image 340-1a is associated with a capture time t1 and the second image 340-2a is associated with a capture time t2. The difference $T_{3D}$ between t2 and t1, i.e. $T_{3D}$=t2−t1 is a time period 363a that corresponds to the time period between subsequent images part of the light triangulation for provision of the 3D image data. Note that the illustrated lengths in time of the exposure periods are just to show that there is an extension in time but are not showing any desirable relation to the time period $T_{3D}$ between subsequent image frames used in the light triangulation.

The exposure periods and time period between subsequent images may be as for conventional light triangulation, although it for some embodiments may be of interest to adjust the exposure periods to accomplish suitable sensing of both the reflected first light 211 and the reflected second light 251 in the same image.

For embodiments according to the first main sub-group of embodiments, respective third sensor position (SP3) is, in Action 202 of the method in FIG. 2B, selected in the first image 340-1, i.e. in IM1, with a respective difference (d) in sensor coordinates to the respective first sensor position (SP1). These embodiments, including said respective difference, are further explained and discussed below in connection with FIGS. 4A, 4D and 5.

FIG. 3B more specifically and schematically shows a third exposure period 361-3b, corresponding to EXP3, that is a new and/or separate exposure period between the first exposure period 361-1b corresponding to EXP1 and the second exposure period 361-2b corresponding to EXP2. The third exposure period 361-3b is the exposure period of a third image 340-3b corresponding to IM3 that thus here is another, separate image from a first image 340-1b corresponding to IM1. It should be realized that the figure shows an example where said one or more third exposure periods (EXP3) and one or more third images (IM3) are just one, i.e. one third exposure period and one third image. However, in other examples and embodiments, not shown in figures herein, there are two or more subsequent EXP3's and IM3's between EXP1, IM1 and EXP2, IM2.

The shown first image 340-1b with first exposure period 361-1b, second image 340-2b with second exposure period 361-2b, time period 363b corresponding to $T_{3D}$, may be as their counterparts in FIG. 3A, and/or may be as for conventional light triangulation. The shown images IM1 and IM2 thus correspond to images used for the light triangulation of the method discussed above in relation to FIG. 2B and the image(s) IM3 is for capturing reflected second light 251. Another difference compared to the first main group of embodiments is that for the second main sub-group of embodiments the first light 211 may be, and advantageously is, prevented from illuminating the measure object 220, e.g. by being switched off, attenuated or directed elsewhere, during the one or more exposure periods (EXP3), such as during 361-3b. This is possible thanks to the separate IM3 for capturing the reflected second light 251, and can be used to remove the risk for light disturbance from the first light e.g. laser, in the one or more third images.

Embodiments of the second main sub-group are further explained and discussed below in connection with FIGS. 4B-C and 5.

Figure 4A:
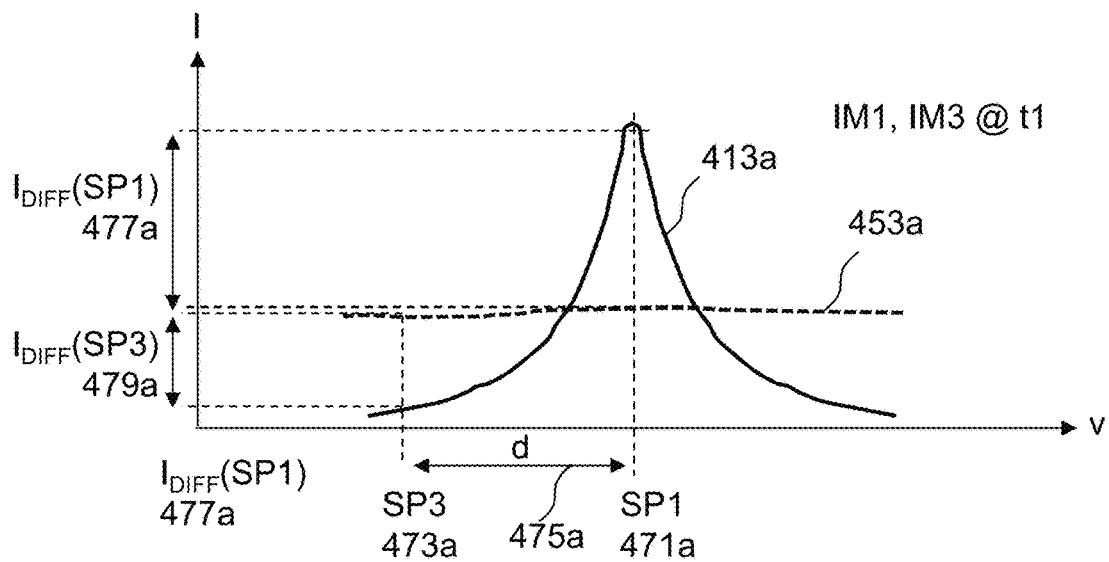
FIG. 4A-D schematically illustrates examples relating to some embodiments herein.
Figure 4B:
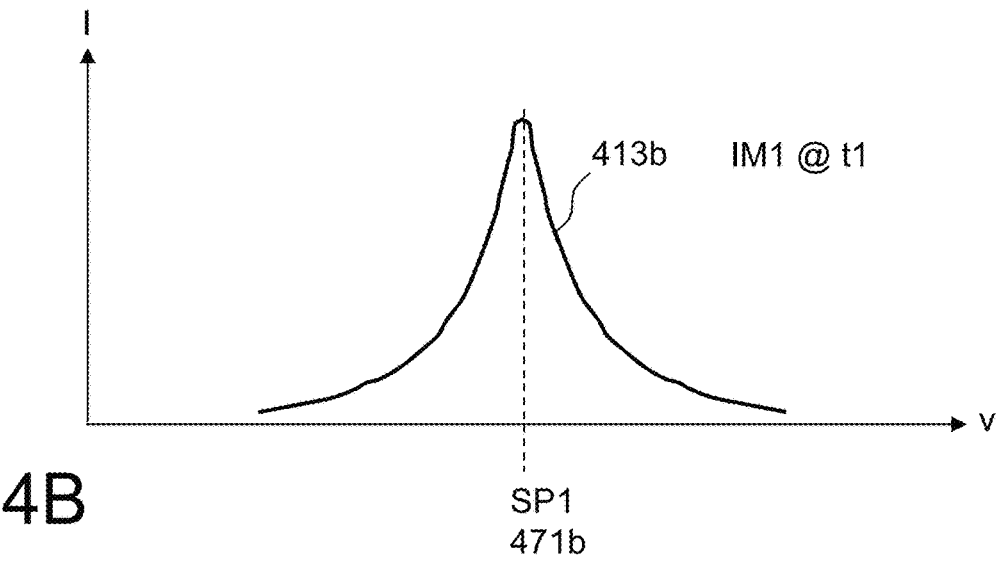
Figure 4C:
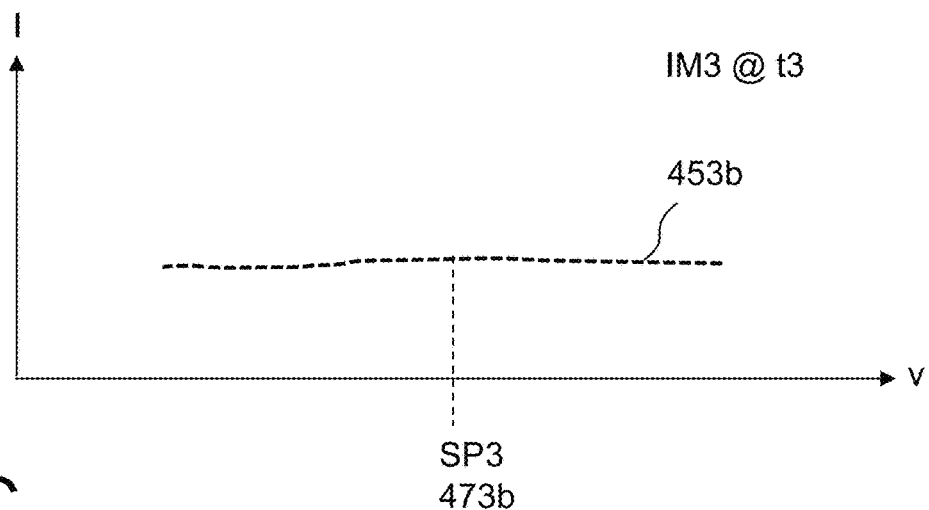
Figure 4D:
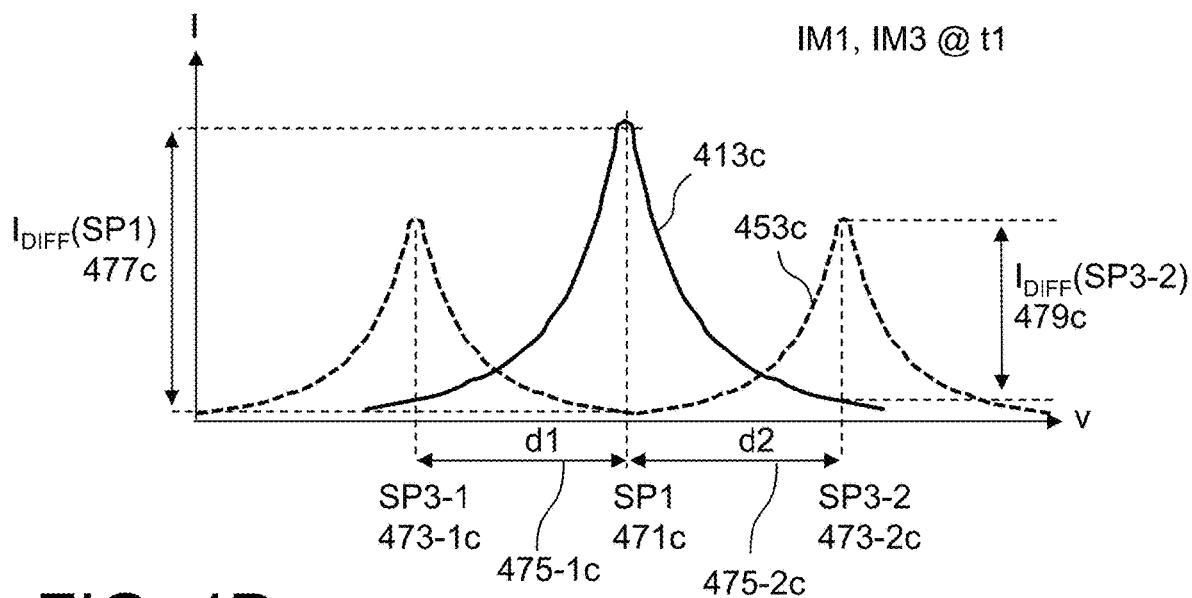

FIG. 4A-D schematically illustrates examples relating to some embodiments herein. Specifically, FIGS. 4A, 4D are examples relating to said first main sub-group of embodiments and FIGS. 4B-C are examples relating to said second main sub-group of embodiments.

FIG. 4A, relating to said first main sub-group of embodiments, shows light intensities along image sensor coordinates v, corresponding to reflected light from a measure object, e.g. the measure object 220, such as sensed by the image sensor 231 during EXP1 and e.g. comprised in IM1. As mentioned above, for the embodiments according to the first main sub-group, IM3=IM1 and EXP3=EXP1. Contributions from the reflected first light 211 and the reflected second light 251 are shown separated in the figure for explanatory reasons. The contribution from the reflected first light, i,e. first light 211 reflected from the measure object 220, sensed by the image sensor 231, corresponds in the figure to a first light intensity distribution 413a. The contribution from the reflected second light, i,e. second light 251 reflected from the measure object 220, sensed by the image sensor 231, corresponds in the figure to a second light intensity distribution 453a. In other words, the first light intensity distribution 413a is an example of first light 211 that has been reflected, i.e. reflected first light, and the second light intensity distribution 453a is an example of second light 251 that has been reflected, i.e. reflected second light. In practice the light intensity distributions 413a and 453a are superimposed, corresponding to adding the shown distributions, thereby forming a single light intensity distribution that corresponds to what is sensed by the image sensor.

The first light intensity distribution 413a is rather narrow and has an intensity peak position 471a corresponding to SP1, as typically is the case when illumination for example is a light line, such as a laser line, on the measure object. The second light intensity distribution 453a is at a substantially constant level, as typically is the case when the second light is provided as diffuse light illuminating the measure object.

It was above in connection with FIG. 3A with reference to Action 202 stated that respective third sensor position (SP3) is selected in the first image 340-1, i.e. in IM1, with a respective difference (d) in sensor coordinates to the respective first sensor position (SP1). A third sensor position 473a, corresponding to SP3, is shown in FIG. 4A. Said difference, d, is shown as a difference 475a in the figure.

Further, above under Action 202, it was stated that said illumination with the one or more second lights 251 may be provided such that during said one or more third exposure periods (EXP3), i.e. only one EXP3 that equals EXP1 for embodiments according to the first main sub-group, any reflected second light from the measure object, such as second light according to the second light intensity distribution 453a, will result in higher intensity than reflected first light 211 in the selected third sensor positions (SP3). This is illustrated in FIG. 4A, where the second light intensity distribution 453a is above the first light intensity distribution 413a in the third sensor position 473a, i.e. in SP3. There is thus a difference in light intensity contribution from the first and second lights in SP3, i.e. a $I_{DIFF}$(SP3), which is shown as a light intensity difference 479a in the figure.

In contrast, the second light intensity distribution 453a is below the first light intensity distribution 413a in the first sensor position 471a, i.e. in SP1. This is also in line with what was indicated above in connection with FIG. 3A, and Action 201, viz. that the illumination may be provided so that during the first exposure period (EXP1), any reflected second light should result in lower intensity than intensity from reflected first light in the first sensor positions (SP1). There is thus also a difference in light intensity from the first and second lights in SP1, i.e. a $I_{DIFF}$(SP1), which is shown as a light intensity difference 479a in the figure.

From the figure it should be realized why SP3 should be selected with the difference d as stated for embodiments according to the first main sub-group, i.e. embodiments where first and second light are sensed in the same image, i.e. where IM1 and IM3 are the same. The reason is that the second light(s) should dominate in SP3 and preferably be as little affected as possible by the first light, although it may be difficult to totally avoid when IM3=M1. Of course, SP3 should also be a position that is close enough to SP1 so that 2D image data in SP3 is considered relevant for 3D image data based on SP1. This is separately discussed below, inter alia in connection with FIG. 5.

Similarly, reflected first light should beneficially dominate in SP1 so that the intensity peaks and thereby light triangulation are not negatively affected. The intensity peak positions should be identifiable, e.g. as conventionally, despite any presence of second light(s). The first light intensity peak should preferably be as little affected as possible by the second light.

In some embodiments, e.g. with diffuse light and an even distribution of second light(s), for a given SP3, an increased $I_{DIFF}$(SP1) means a decreased $I_{DIFF}$(SP3). It is then about finding a suitable balance between these and/or select SP3 suitably. For most practical situations, e.g. with even second light distribution, this will not be a problem since the second light intensity level typically without any problem can be kept well below the first light peak intensity level that also decreases rapidly when moving away from SP1, i.e. the peak is quite narrow. If needed for a specific application, the skilled person will be able to, e.g. through routine testing and experimentation, select a suitable SP3 and second light(s) intensity level for SP3.

FIGS. 4B-C relate to said second main sub-group of embodiments and show light intensities along image sensor coordinates v, corresponding to reflected light from a measure object, e.g. the measure object 220, and sensed by the image sensor 231. FIG. 4B shows sensed reflected first light 211 during EXP1 and e.g. comprised in IM1, while FIG. 4C shows sensed reflected second light 251 during EXP3 and e.g. comprised in IM3 that for these embodiments, as explained above, is separate from IM1. FIG. 4B shows a first light intensity distribution 413b that corresponds to and may be the same as the first light intensity distribution 413a. FIG. 4C shows a second light intensity distribution 453b that corresponds to and may be the same as the second light intensity distribution 453a. For these embodiments, although not shown in figures, in case of further third images, IM3, yet another figure as FIG. 4C could be provided with yet another second light intensity distribution resulting from sensing of reflected second light(s) during a further EXP3 of the image resulting in said further IM3. A first sensor position 471b, corresponding to SP1, is shown in FIG. 4B. A third sensor position 473b, corresponding to SP3, is shown in FIG. 4C.

It was above in connection with FIG. 3B, stated that the first light 211 may be, and advantageously is, prevented from illuminating the measure object 220, during the one or more exposure periods (EXP3), e.g. the third exposure period 361-3b. Any first light can thereby not be captured in IM3, which clearly is the case in FIG. 4C. Similarly, as also mentioned above, the second light 251 may be prevented from illuminating the measure object 220 during the first exposure period 361-1b, i.e. during EXP1 and thus not captured in IM1, as can be seen in FIG. 4B. As realized from comparing FIGS. 4B-C with FIG. 4A this means that the reflected first light and second light do not interfere with each other independent on where SP3 is selected in relation to SP1. Hence, thanks to that only reflected first light or second light is present at the same time in an image, there is no need to position SP3 at a distance d from SP1 as in FIG. 4A, instead SP3 can, as indicated in FIGS. 4B-C, e.g. be in the same sensor position as SP1, which makes it very simple to select SP3. In other words, the respective third sensor position, SP3, in said one or more third images (IM3), e.g. 340-3, may be selected at the same respective first sensor position, SP1, e.g. 471b, as the intensity peaks in the first image (IM1), e.g. 340-1. Of course a distance in sensor position v, corresponding to d, is typically acceptable also for these embodiments.

Note that since light triangulation is typically performed with a continuous movement of the measure object and/or camera/light source in relation to each other, IM3 at another time than IM1, e.g. at the time t3 that is later than IM1 at the time t2, means that there nevertheless has been some change in measure object position that map to one and the same sensor position. In other words, SP3, even at the same sensor position as SP1, may still map with some offset to the actual object position on the measure object that reflected the light resulting in the intensity peak position SP1. However, in general, for in principle all conventional and practical light triangulation systems, the difference in object position between two consecutive images used in the light triangulation, such as between IM1 and IM3, will typically be smaller than any d used for the embodiments discussed in relation to FIG. 4A. However, still, to make 2D image data in SP3 to be as relevant as possible for SP1 when in the same sensor position, e.g. for same u,v, IM3 may be provided as soon as possible after IM1, minimizing the distance caused by movement between t1 and t3. For example, said one or more third exposure periods (EXP3) may be exposure period(s) adjacent to the first exposure period (EXP1), e.g. as close as possible before or after EXP1. For embodiments where EXP3 are several exposure periods these may be consecutive and following as soon as possible after each other and as close as possible to EXP1.

Of course, SP3 could also be selected with some offset in sensor position to compensate for movement and change in measure object position between t1 and t3, but thus will typically not be needed. In general, a greater offset is needed to be accepted between measure object position mapping to SP1 and measure object position mapping to SP3 for embodiments according to the first main sub-group compared to the second main sub-group.

A solution that completely removes any offset, is to make sure that there is no relative movement between the measure object 220 and the image sensor 231 between IM1 and IM3, e.g. by temporarily stopping the relative movement used in the light triangulation, e.g. stopping at t1 and starting again at t3. This however is typically not desirable for practical reasons and will typically also cause reduced light triangulation system throughput, e.g. if implemented by adapting an existing light triangulation system.

FIG. 4D, just as FIG. 4A, relates to said first main sub-group of embodiments and is just another example.

What is shown is an example where it is used two sensor positions for SP3, SP3-1 and SP3-3, exemplified in the figure by third sensor positions 473-1c, 473-2c, respectively. These are preferably on each side of SP1, such as at the same distance from SP1. If, as shown, SP3-1 473-1c is at a distance d1 475-1c from SP1 and SP3-2 473-2c is at a distance d2 475-2c from SP1, d1 may be equal to d2, although this is not necessary. The obtained 2D image data may be provided as an average of 2D image data from SP3-1 and SP3-2, which may improve relevance of the 2D image data for SP3, especially when SP1 is located between SP3-1 and SP3-2. This can be seen as sampling and obtaining 2D image data, based on the second light(s), for SP3 from two close positions on both sides of SP1, to make the second image data more relevant when an offset, corresponding to d, or d1 and d2, cannot be avoided for the first main sub-group of embodiments.

The principle with two or multiple SP3 for each SP1, such as one on each side, can of course also be used with other second light distribution than shown in FIG. 4D, e.g. with a more even second light distribution as shown in FIG. 4A.

A further difference compared to what is shown in FIG. 4A is that the second lights are illuminating the measure object 220 with more narrow light distribution on the measure object, e.g. the measure object 220, so that there can be less contribution of second light intensity in SP1. In the shown example the light intensity distribution 453c may correspond to two narrow second light illumination areas on each side of the first light illumination on the measure object, e.g. by from use of two second light sources. The narrow light distribution may as shown be similar narrow as the first light as shown in the figure, with a maxima or peak, such as on each side of the first intensity peak SP1. The second lights and second light intensity distribution may correspond to two light lines or bands on the measure object, e.g. the measure object 220, on each side of a light line corresponding to the first light 211. Embodiments like this can be seen as utilizing that the second lights actually only need to provide second light illumination in SP3. With more narrow second light distribution than in FIG. 4A it may be possible to reduce interference of second light in SP1 and still be possible to provide sufficient illumination in SP3. For embodiments like in FIG. 4D with narrow second light distribution, intensity peaks of the second light may advantageously be provided at SP3, i.e. where SP3 is selected, in the shown example at SP3-1 and SP3-2. This may make it possible with a smaller d compared to a case with broader and more even second light distribution as in FIG. 4A and thereby to obtain 2D image data more relevant for SP1. For example, in comparison with FIG. 4A, $I_{DIFF}(SP1)$ 477c can be greater than $I_{DIFF}(SP1)$ 477a for the same SP1, and $I_{DIFF}(SP3-2)$ 479c can be greater than $I_{DIFF}(SP3)$ 47a for the same SP3.

Figure 5:
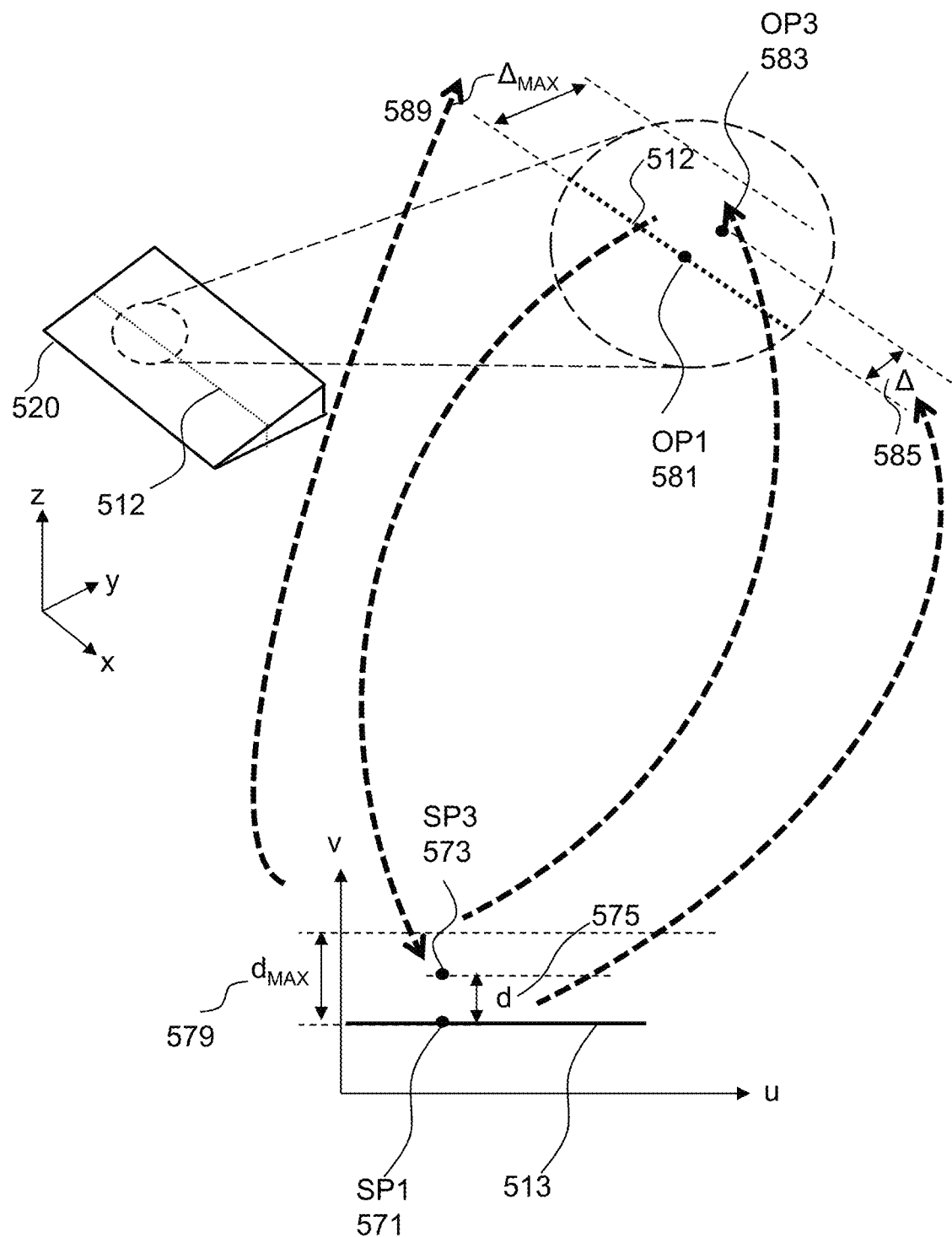
FIG. 5 schematically illustrates an example with a difference between sensor positions SP1 and SP3.

FIG. 5 schematically illustrates an example with a difference between sensor positions SP1 and SP3, and a corresponding difference between measure object positions OP1 and OP3 that the involved sensor positions map to.

As measure object is here a measure object 520 with a wedge like shape in a real world coordinate system x, y, z. A light line 512 of first light is shown on the measure object 520. The first light may be as in the examples above. A magnification is shown of a surface area on the measure object 520 covering also part of the light line 512, with a first object point (OP1) 581 that is illuminated by the light line 512. The OP1 581 maps to a first sensor position SP1 571, corresponding to such SP1 discussed above and here shown in sensor coordinates u, v. What is show in the lower diagram with u,v on the axis is thus what an image IM, e.g. IM1, taken as part of light triangulation may look like in sensor coordinates if only identified first intensity peak positions in v are shown for all u. There is a light intensity peak position line 513 shown in sensor coordinates u, v that thus maps to the light line 512 in real world coordinates x, y, z. The mapping follows from typically predetermined operation condition and relations used for the light triangulation, e.g. as in conventional light triangulation.

When a SP3 is selected as discussed above for the first sub-group of embodiments at a distance d from SP1, the SP3 actually maps to another point on the measure object 520, e.g. a third object point OP3 583 at a distance Δ 585 from OP1 581. Thanks to selecting SP3 in connection with the light triangulation and the intensity peak position SP1, the SP3 position in which the 2D image data is obtained can be controlled and all 2D image data for all SP3s be consistently obtained with the same distance d, i.e. an offset, to their respective SP1. Second light(s) can be provided that enable a distance d that is small enough for relevant 2D image data in SP3 for most, if not all, practical applications, as already indicted above. Also, the distance d, since it is known, can be adjusted or compensated for, at least to some degree for some applications and in some situations, if this is desirable.

However, in any case, it is realized that it is desirable with a d that is as small as possible since this means that Δ will be as small as possible as well, and thus OP2 be closer to OP1, which in turn typically means that the obtained 2D data in SP3 will be more relevant for SP1 and its corresponding OP1. In other words, 3D image data imaging OP1 can be associated with more relevant 2D image data for OP1.

There may be a predetermined maximum distance ($d_{MAX}$), in the figure illustrated by a $d_{MAX}$ 579 in the sensor coordinates and that corresponds to a maximum allowed offset for the 2D data to be considered relevant for the 3D data. What can be considered allowed is application specific, e.g. how the imaging system involved has been configured for the light triangulation and requirements regarding the 2D image data. The $d_{MAX}$ can e.g. be expressed in a predetermined number of pixels. The $d_{MAX}$ may correspond to a counterpart maximum allowed distance $\Delta_{MAX}$ in the real world, e.g. as illustrated in the figure by $\Delta_{MAX}$ 589.

Hence, for embodiments herein, such as discussed above in connection with the method related to FIG. 2A, said third sensor positions, SP3, may be selected such that a respective difference (d) between respective third sensor position (SP3) and the respective first sensor position (SP1), in sensor coordinates with adjustment for any real world movement of the measure object, e.g. the measure object 220 or 520, between the first image (IM1) and said one or more third image (IM3), is within a predetermined maximum distance, e.g. $d_{MAX}$ 579, corresponding to an application specific maximum allowed offset for 2D image data to be considered relevant for 3D image data.

The part "with adjustment for any real world movement of the measure object" relates to the second main sub-group of embodiments, i.e. with IM3 separated from IM1 and IM2, and where in it, as disclosed above in relation to FIGS. 4B-C, typically is a movement of the measure object between e.g. SP1 in IM1 and SP3 in IM3. Thus, even when SP3=SP1, SP3 in IM3 may not map to the same object position as SP1 in IM1. It is realized from the above that also this corresponds to a difference in sensor coordinates. In case of the first main sub-group of embodiments where IM3=IM1, there is no real world movement involved between the images.

FIGS. 6A-E schematically illustrates examples of various imaging systems that can be configured to carry out embodiments herein, i.e can be used for implementing embodiments herein. The systems are particularly about how different second light(s) can be provided for embodiments herein. The shown imaging system examples can be seen as more detailed examples, variants and/or extensions of the more general imaging system 205 disclosed above in relation to FIG. 2B. Hence, in the following, focus will only be on details that differ compared to the imaging system 205, in particular regarding the second lights(s), and how respective imaging system example supports and/or can be used to implement embodiments herein.

Figure 6A:
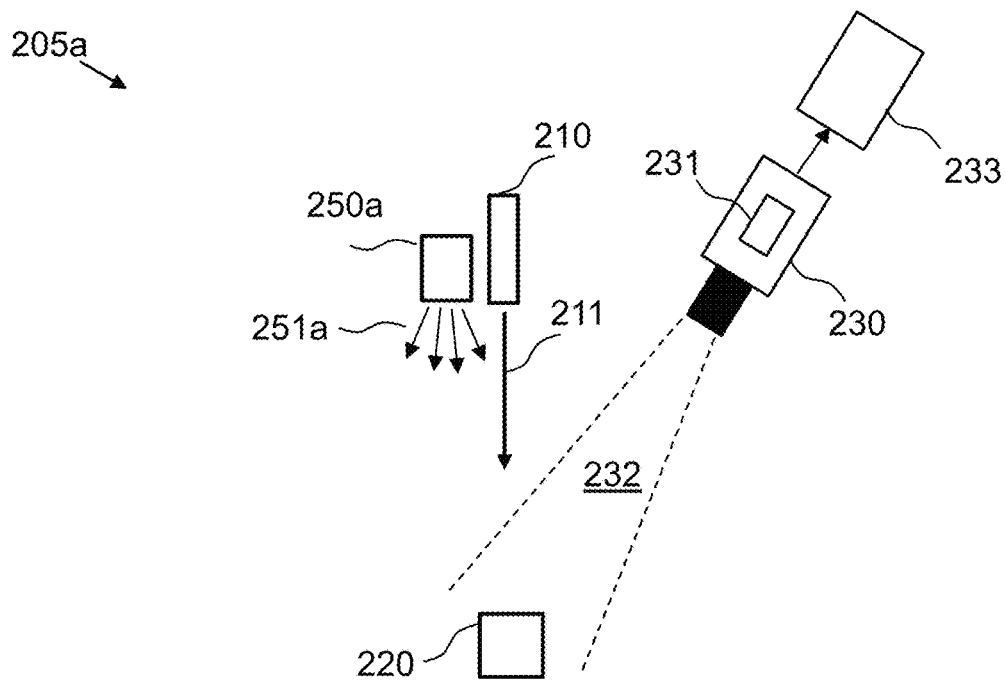
FIGS. 6A-E schematically illustrates examples of various imaging systems that can be configured to carry out embodiments herein.

FIG. 6A schematically illustrates an imaging system 205*a* where a second light source 250*a* provides second light 251*a* from substantially the same direction and location as the first light source 210 is providing the first light 211. As illustrated the provided second light 251*a* may be diffuse light.

Hence, with reference to the method discussed above in relation to FIG. 2B, said second light sources may comprise at least one light source, e.g. 250*a*, providing second light, e.g. the second light 251*a*, from the same direction and/or location as the first light source 210 is providing the first light 211.

Embodiments based on the imaging system 205*a* facilitate implementation and provide sufficient second light illumination for many applications. For example, a single illumination unit with both the first and second light sources may be provided and be used.

Figure 6B:
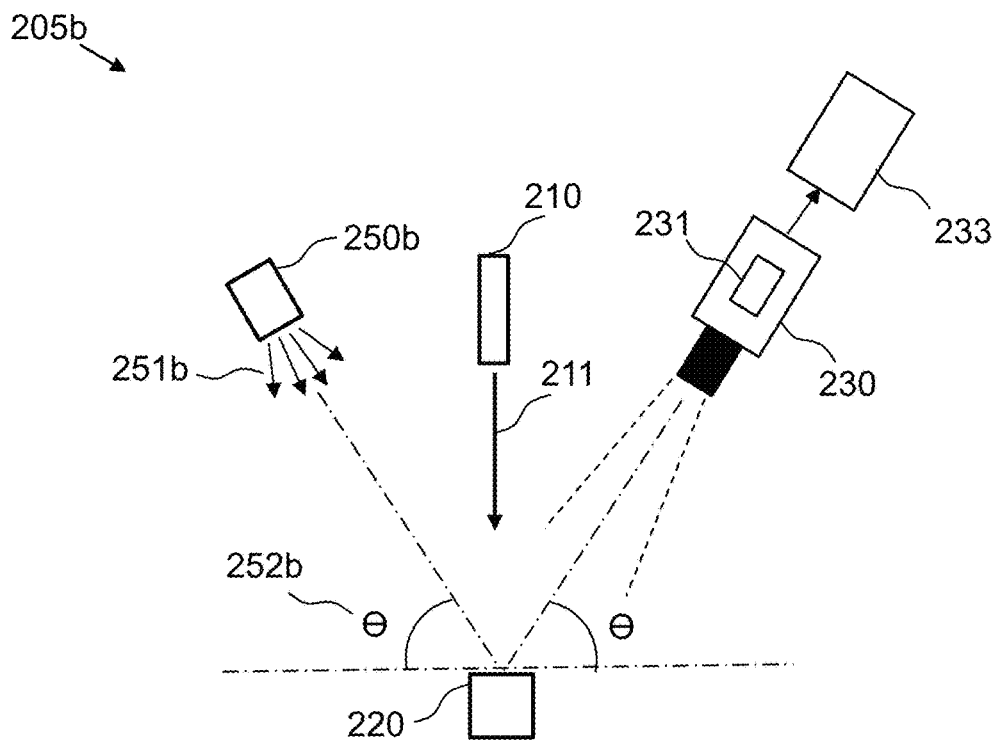

FIG. 6B schematically illustrates an imaging system 205*b* where a second light source 250*b* provides second light 251*b* from a direction defined by an angle θ 252*b* that cause second light illumination on the measure object (220; 520), e.g. a surface thereof, resulting in specular second light reflections on the camera 230 and image sensor 231 and thereby illumination on the third sensor positions SP3.

Hence, with reference to the method discussed above in relation to FIG. 2B, said second light sources may comprise at least one light source, e.g. 250*b*, providing second light, e.g. 251*b*, from a direction, e.g. defined by 252*b*, that causes second light illumination on the measure object 220 resulting in specular second light reflections that illuminate at least some of the third sensor positions (SP3).

To setup the imaging system 205*b* to cause desirable specular second light reflections, e.g. to find suitable position and direction of the second light source 250*b*, the specular second light reflection should on measure object positions that map to third sensor positions (SP3), i.e. at or near where the first light illuminate the measure object, i.e. the specular reflection may be aimed to occur at the location of where the first light, e.g. laser, will illuminate the measure object during the light triangulation. If there is a known offset, e.g. a predetermined distance d where SP3 will be located in relation to SP1, the location for specular reflection may take this into account although it typically means a very small difference in object position.

Embodiments based on the imaging system 205*b* may be particularly advantageous when it is desirable to be able to inspect a flat surfaces of a measure object, e.g. a measure object with a single or main flat surface of interest to inspect. The imaging system 205*b* may be setup so that the second light source(s) will cause specular reflection on such surface so that reflected light will be on SP3s on the image sensor. Specular reflection may be particularly good to capture image information regarding surface gloss variations and/or about very shallow surface variations, e.g. damages such as scratches, and their orientation. By applying embodiments in such variations may be visible as darkness in an else bright image of the measure object surface.

Figure 6C:
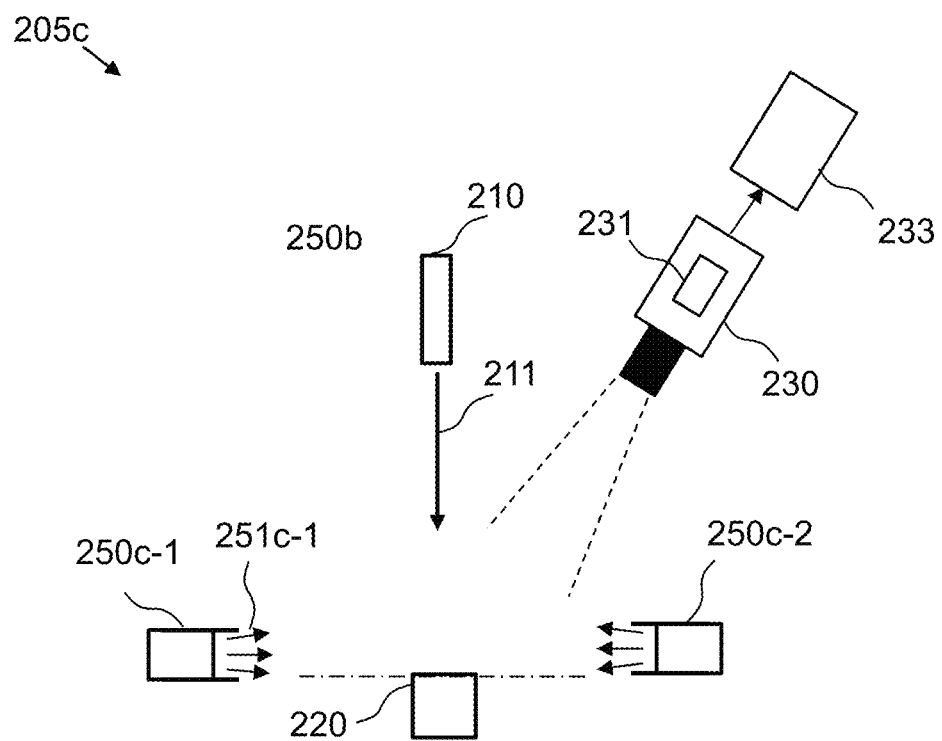

FIG. 6C schematically illustrates an imaging system 205*c* where second light sources 250*c*-1 and 250*c*-2 provides second lights 251*c*-1 and 250*c*-2 from opposite directions as dark field illumination along a surface of the measure object 220. In case of any protrusions on said surface, these will cause second light reflections that illuminate the camera 230 and image sensor 231, including third sensor positions, SP3.

Figure 6D:
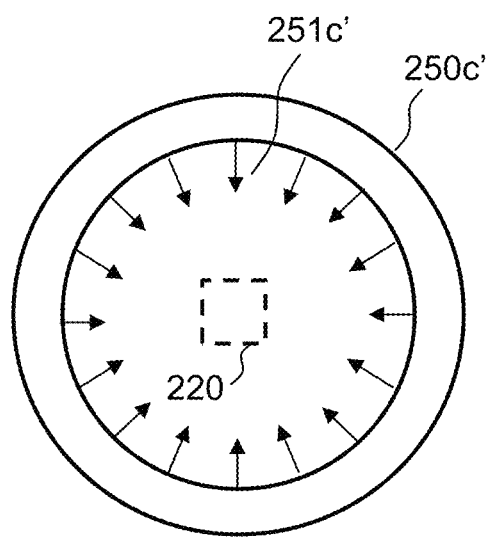

FIG. 6D schematically illustrates a top view of how second light sources or a single second light source 250*c*' can enclose the measure object 220 so that second lights 251*c*' can be provided as dark field illumination from multiple directions and sides.

Hence, with reference to the method discussed above in relation to FIG. 2B, said second light sources may comprise one or more light sources, e.g. 250*c*, providing second lights, e.g. 251*c*, as dark field illumination along a surface of the measure object 220, such that any illuminated protruding structure on said surface will cause second light reflections that illuminate at least some of the third sensor positions (SP3).

Dark field illumination like this can be particularly advantageous to identify surface roughness, or structures, if any, resulting in surface roughness, e.g. roughness caused by bumps or scratches in a surface. With dark field illumination any structure causing roughness is typically visible as brightness in an else dark image of the measure object surface.

Figure 6E:
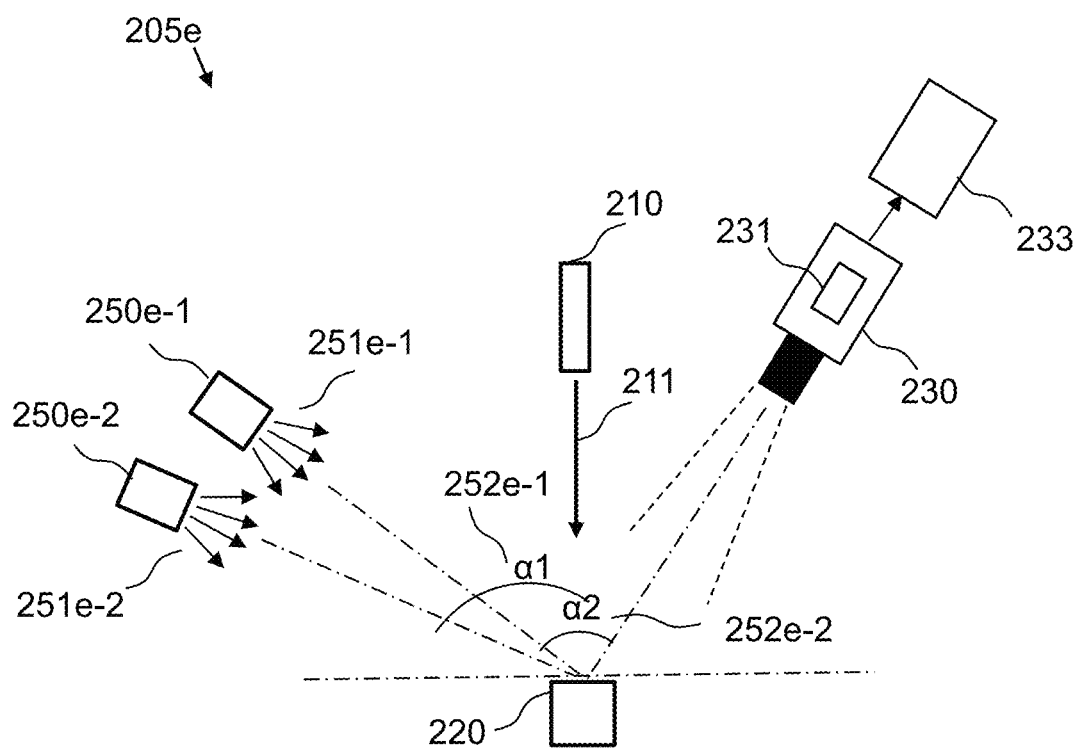

FIG. 6E schematically illustrates an imaging system 205*e* where second light sources 250*e*-1 and 250*e*-2 provide second lights 251*e*-1 and 251*e*-2 at two different angles, e.g. at 120 and 90 degrees, towards the camera 230 and image sensor 231. The second lights could alternatively or additionally be from opposite directions, e.g. left-right in the figure.

More generally, with reference to the method discussed above in relation to FIG. 2B, said second light sources may provide second lights, e.g. 251*e*-1, 251*e*-2, from at least two different directions, e.g. 252*e*-1, 252*e*-2, respectively, that cause second lights illumination on the measure object 220 resulting in second lights reflections that illuminate at least some of the third sensor positions, SP3. The two directions may be different relative to the object surface orientation so that the surface orientation may be estimated, e.g. using any conventional photometric stereo method.

Furthermore, with reference to the method discussed above in relation to FIG. 2B:

Said second lights in embodiments herein may be of the same and/or different light wavelength(s) as the first light. The second light(s) typically comprise one or more wavelengths of visible light, but in some embodiment comprises or corresponds to wavelength(s) outside and/or near the range of (human) visual light, such as ultraviolet (UV) light. Non-visual light such as UV can for example be used with a fluorescent measure object in some embodiments, i.e. when the measure object comprises fluorescent material that makes it surface, or part thereof, fluorescent. In such embodiment, a UV-block filer may be used with the camera, at least during said one or more third exposure periods, so that only the fluorescent light from the measure object is captured in said one or more third images (IM3). In such embodiments the fluorescence material, e.g. presence of such on the measure object surface, appear bright in said one or more third images (IM3). That is, in such embodiments, reflected second light means light that has been reflected back while fluorescing and changing wavelength to one with less energy.

In some embodiments, said second light source(s), e.g. the second light sources 250a or multiple such second light sources, or the second light sources 250e-1, 250e-2, provide second lights, e.g. 251a or 250e-1 and 250e-2, of different wavelengths and wherein said second lights illuminating the measure object 220 differ in light wavelengths between two or more of said third exposure periods 361-3. Hence, these embodiments are for use with multiple third exposure periods (EXP3) and thus with the second main sub-group of embodiments.

Multiple third exposure periods (EXP3) and multiple third images (IM3), in particular using different light wavelengths in different exposures, but alternatively or additionally with second lights provided from different directions during different third exposure periods, can be used to extract extra or further information from the measure object and capture the information in the 2D image data, and thereby, thanks to embodiments herein, get this information associated with the 3D image data from light triangulation.

With multiple second light sources in embodiments herein it is further possible to use and provide sequences of third images (IM3), where e.g. a separate second light source may be used for each third image IM3 between IM1 and IM2. Respective such third image may sample diffuse, specular and dark field reflectance data from around SP1.

It may obtained image data from multiple neighboring positions, e.g. rows, to SP3s in said one or more third images (IM3), to obtain further information about the measure object from the reflected second light(s). This e.g. makes it possible to create an intensity image with higher sampling density in the motion, i.e. scan, direction than is used in the light triangulation, and/or makes it possible to alternate between different illumination types, e.g., specular and dark field illumination, in alternating cycles, without losing resolution in the scan direction.

Figure 7A:
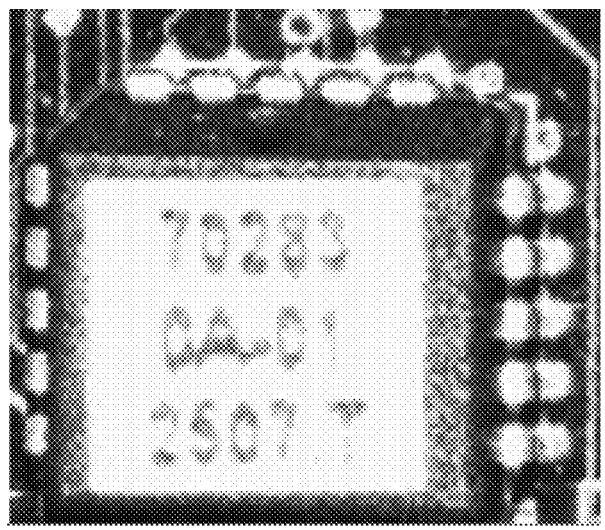
FIGS. 7A-B show images of a measure object based on 2D image data generated without and with application of embodiments herein.
Figure 7B:
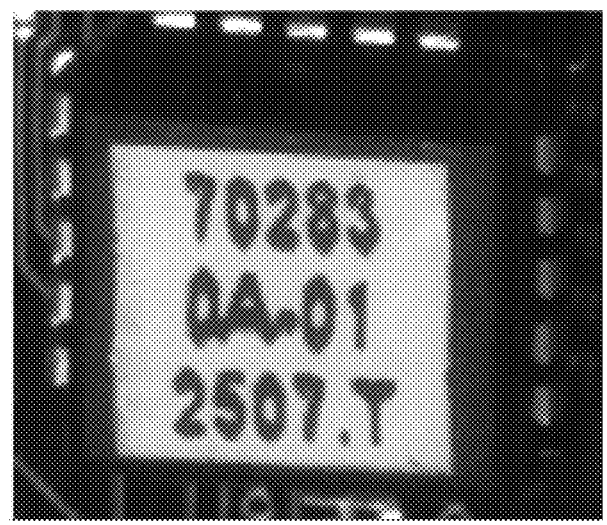

FIGS. 7A-B show example images of a measure object based on 2D image data generated without and with application of embodiments herein. FIG. 7A shows result when a first light source being a laser, e.g. corresponding to the first light source 110, has been used to generate 2D image data of a measure object. FIG. 7B shows result when a second light source, e.g. corresponding to the second light source 250, with diffuse light from a LED, as in embodiments herein, has been used to generate 2D data of the same measure object. In the first case, in FIG. 7A, laser speckle effects are present and visible. In contrast, in FIG. 7B, based on embodiments herein, it is shown a much improved image without laser speckle effects.

Figure 8A:
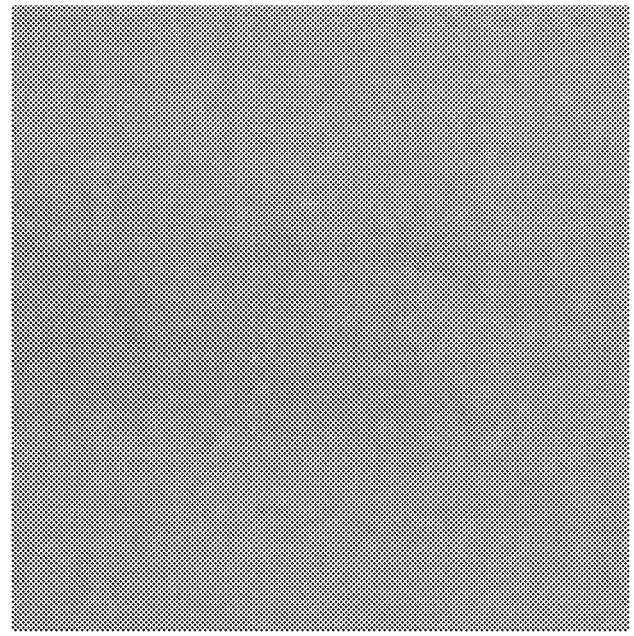
FIGS. 8A-B show another example images of a measure object based on 2D image data generated without and with application of embodiments herein.
Figure 8B:

FIGS. 8A-B show another example images of a measure object based on 2D image data generated without and with application of embodiments herein. The surface imaged of the measure object is painted semi glossy and has some minor shallow damages in the form of very small scratches and a slightly "rugged up" area. FIG. 8A shows result when a first light source being a laser, e.g. corresponding to the first light source 110, has been used to generate 2D image data of the surface, i.e. the image in FIG. 8A is based on first light reflectance. FIG. 8B shows result when a second light source, e.g. corresponding to the second light source 250, as in embodiments herein has been used. In particular it has been used second light with specular reflection, i.e. based on embodiments herein as described in relation to FIG. 6B. In other words, the image in FIG. 8B is based on second light specular reflectance.

As can be seen, said minor and shallow damages are not visible and has not been captured well by the 2D image data that the image of FIG. 8A is based on, while said minor and shallow damages are clearly visible and thus have been well captured by the 2D image data that the image in FIG. 8B is based on.

Figure 9:
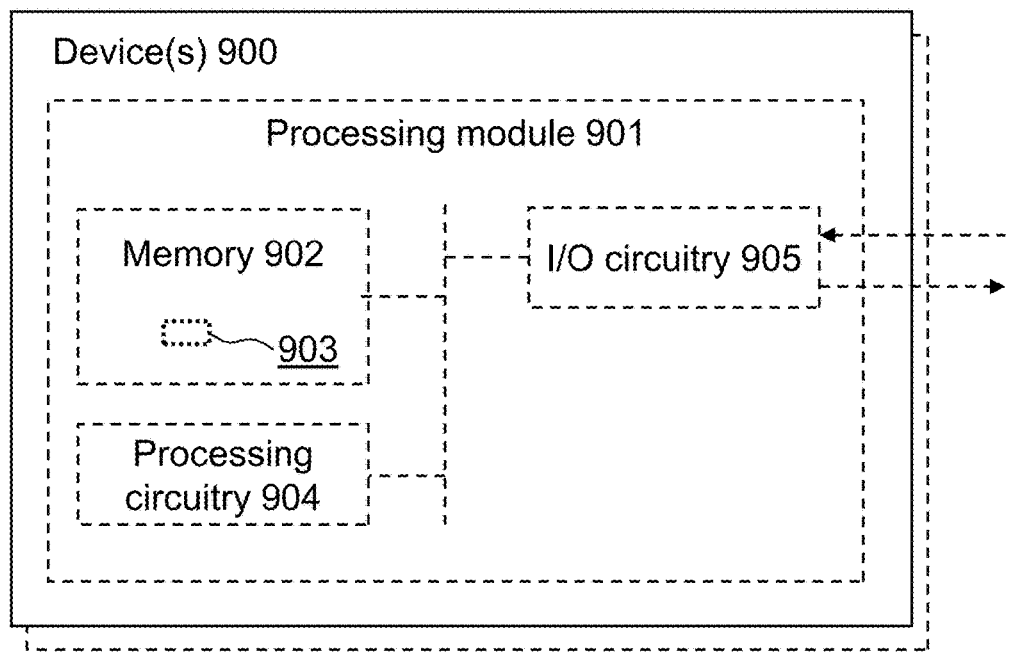
FIG. 9 is a schematic block diagram for illustrating embodiments of one or more devices may be configured to perform the method and actions discussed in relation to FIG. 2B.

FIG. 9 is a schematic block diagram for illustrating embodiments of one or more devices 900, i.e. device(s) 900, that may correspond to devices(s) already mentioned in the above for performing embodiments herein, such as for performing the method and/or actions described above in relation to FIG. 2A. The device(s) 900 may e.g. correspond to the computing device 233 and/or the camera 230, or suitable devices comprised in and/or forming any of the imaging systems disclosed herein, such as any one of the imaging systems 205, 205a-e.

The schematic block diagram is for illustrating embodiments regarding how the device(s) 900 may be configured to perform the method and actions discussed above in relation to FIG. 2A. Hence, the device(s) 900 is for obtaining and associating said 2D image data with said 3D image data, the 3D image data being based on said first intensity peak positions resulting from light triangulation performed by an imaging system, e.g. any one of imaging systems 205, 205a-e.

The device(s) 900 may comprise a processing module 901, such as processing means, one or more hardware modules, including e.g. one or more processing circuits, circuitry, such as processors, and/or one or more software modules for performing said method and/or actions.

The device(s) 900 may further comprise memory 902 that may comprise, such as contain or store, a computer program 903. The computer program 903 comprises 'instructions' or 'code' directly or indirectly executable by the device(s) 900 to perform said method and/or actions. The memory 902 may comprise one or more memory units and may further be arranged to store data, such as configurations, data and/or values, involved in or for performing functions and actions of embodiments herein.

Moreover, the device(s) 900 may comprise processing circuitry 904 involved in processing and e.g. encoding data, as exemplifying hardware module(s) and may comprise or correspond to one or more processors or processing circuits. The processing module(s) 901 may comprise, e.g. 'be embodied in the form of' or 'realized by' the processing circuitry 904. In these embodiments, the memory 902 may comprise the computer program 903 executable by the processing circuitry 904, whereby the device(s) 900 is operative, or configured, to perform said method and/or actions thereof.

Typically the device(s) 900, e.g. the processing module(s) 901, comprises an Input/Output (I/O) module(s) 905, configured to be involved in, e.g. by performing, any communication to and/or from other units and/or devices, such as sending and/or receiving information to and/or from other devices. The I/O module(s) 905 may be exemplified by obtaining, e.g. receiving, module(s) and/or providing, e.g. sending, module(s), when applicable.

Further, in some embodiments, the device(s) 900, e.g. the processing module(s) 901, comprises one or more of illuminating module(s), sensing module(s), selecting modules(s), providing module(s), obtaining module(s), associating module(s), as exemplifying hardware and/or software module(s) for carrying out actions of embodiments herein. These modules may be fully or partly implemented by the processing circuitry 904.

Hence:

The device(s) 900, and/or the processing module(s) 901, and/or the processing circuitry 904, and/or the I/O module(s) 905, and/or the illuminating module(s) and/or the sensing module(s), may be operative, or configured, to, illuminate the measure object with said one or more second lights and sense any reflected second light from the measure object by the image sensor during said one or more third exposure periods.

The device(s) 900, and/or the processing module(s) 901, and/or the processing circuitry 904, and/or the I/O module(s) 905, and/or the selecting module(s), and/or the providing module(s), may be operative, or configured, to, select, for respective first sensor position, SP1, in the first image, said respective third sensor position, SP3, in said one or more third images and provide said illumination with the one or more second lights such that during said one or more third exposure periods, any reflected second light from the measure object will result in higher intensity than reflected first light in the selected third sensor positions, SP3.

The device(s) 900, and/or the processing module(s) 901, and/or the processing circuitry 904, and/or the I/O module(s) 905, and/or the obtaining module(s), and/or the associating module(s), may be operative, or configured, to, obtain said 2D image data of said respective third sensor position, SP3, in said one or more third images and associate the obtained 2D image data with the first sensor position, SP1, that the respective third sensor position, SP3, was selected for.

Figure 10:
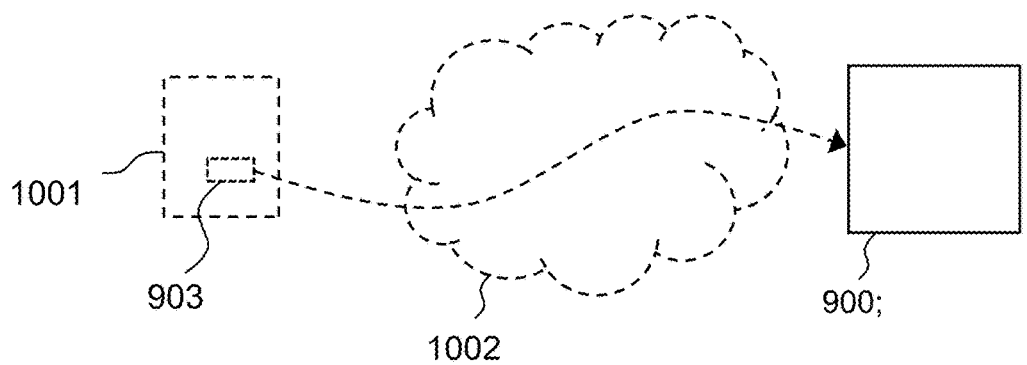
FIG. 10 is a schematic drawing illustrating some embodiments relating to computer program and carriers thereof to cause device(s) to perform the method and actions discussed in relation to FIG. 2B.

FIG. 10 is a schematic drawing illustrating some embodiments relating to computer program and carriers thereof to cause said device(s) 1000 discussed above to perform said method and actions.

The computer program may be the computer program 903 and comprises instructions that when executed by the processing circuitry 904 and/or the processing module(s) 901, cause the device(s) 900 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 1001 as schematically illustrated in the figure. The computer program 903 may thus be stored on the computer readable storage medium 1001. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 1001 may be used for storing data accessible over a computer network 1002, e.g. the Internet or a Local Area Network (LAN). The computer program 903 may furthermore be provided as pure computer program(s) or comprised in a file or files. The file or files may be stored on the computer readable storage medium 1001 and e.g. available through download e.g. over the computer network 1002 as indicated in the figure, e.g. via a server. The server may e.g. be a web or File Transfer Protocol (FTP) server. The file or files may e.g. be executable files for direct or indirect download to and execution on said device(s) to make it perform as described above, e.g. by execution by the processing circuitry 904. The file or files may also or alternatively be for intermediate download and compilation involving the same or another processor(s) to make them executable before further download and execution causing said device(s) 900 to perform as described above.

Note that any processing module(s) and circuit(s) mentioned in the foregoing may be implemented as a software and/or hardware module, e.g. in existing hardware and/or as an Application Specific Integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the device(s), sensor(s) etc. to be configured to and/or to perform the above-described methods and actions.

Identification by any identifier herein may be implicit or explicit. The identification may be unique in a certain context, e.g. for a certain computer program or program provider.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value"

may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. Method for obtaining and associating 2D image data with 3D image data, said 3D image data being based on first intensity peak positions resulting from light triangulation performed by an imaging system comprising a first light source for illuminating a measure object with first light and an image sensor for sensing reflected first light from the measure object, wherein the light triangulation comprises to illuminate a first portion of the measure object with the first light and sense reflected first light from the first portion by the image sensor during a first exposure period resulting in a first image with first intensity peaks occurring at first sensor positions, SP1, and illuminate another, second, portion of the measure object adjacent to said first portion with the first light and sense reflected first light from the second portion by the image sensor during another, second exposure period resulting in a second image with second intensity peaks occurring at second sensor positions, SP2, and wherein the imaging system further comprises one or more additional, second, light sources for illuminating the measure object with one or more second lights, wherein the method comprises:
   illuminating the measure object with said one or more second lights and sensing any reflected second light from the measure object by the image sensor during one or more third exposure periods resulting in one or more third images,
   selecting, for respective first sensor position, SP1, in the first image, a respective third sensor position, SP3, in said one or more third images and providing said illumination with the one or more second lights such that during said one or more third exposure periods, any reflected second light from the measure object will result in higher intensity than reflected first light in the selected third sensor positions, SP3, and
   obtaining 2D image data of respective selected third sensor position, SP3, in said one or more third images and associating the obtained 2D image data with the first sensor position, SP1, that the respective selected third sensor position, SP3, was selected for, whereby the obtained 2D image data become associated with the 3D image data.

2. The method as claimed in claim 1, wherein the selected third sensor positions, SP3, are selected such that a respective difference between respective selected third sensor position SP3 and the respective first sensor position, SP1, in sensor coordinates with adjustment for any real world movement of the measure object between the first image and said one or more third images, is within a predetermined maximum distance corresponding to an application specific maximum allowed offset for 2D data to be considered relevant for 3D data.

3. The method as claimed in claim 1, wherein said one or more third exposure periods is the first exposure period and said one or more third images is the first image, and wherein respective selected third sensor position, SP3, in the first image is selected with a respective difference in sensor coordinates to the respective first sensor position, SP1.

4. The method as claimed in claim 1, wherein said one or more third exposure periods are separate one or more exposure periods between the first exposure period and the second exposure period.

5. The method as claimed in claim 4, wherein the first light is prevented from illuminating the measure object during said one or more third exposure periods.

6. The method as claimed in claim 4, wherein said one or more second lights are prevented from illuminating the measure object during the first exposure period and the second exposure period.

7. The method as claimed in claim 4, wherein the respective selected third sensor position, SP3, in said one or more third images is selected at the same respective first sensor position, SP1, as the intensity peaks in the first image.

8. The method as claimed in claim 4, wherein said second light sources provide second lights of different wavelengths and wherein said second lights illuminating the measure object differ in light wavelengths between two or more of said third exposure periods.

9. The method as claimed in claim 1, wherein at least one of said second light sources are providing diffuse second light.

10. The method as claimed in claim 1, wherein said second light sources comprise at least one light source providing second light from the same direction and/or location as the first light source is providing the first light.

11. The method as claimed in claim 1, wherein said second light sources comprise at least one light source providing second light from a direction that causes second light illumination on the measure object resulting in specular second light reflections that illuminate at least some of the selected third sensor positions, SP3.

12. The method as claimed in claim 1, wherein said second light sources comprise one or more light sources providing second lights as dark field illumination along a surface of the measure object, such that any illuminated protruding structure on said surface will cause second light reflections that illuminate at least some of the selected third sensor positions, SP3.

13. The method as claimed in claim 1, wherein said second light sources provide second lights from at least two different directions, respectively, that cause second lights illumination on the measure object resulting in second lights reflections that illuminate at least some of the selected third sensor positions, SP3.

14. A non-transitory computer readable storage medium comprising instructions that when executed by one or more processors causes one or more devices to perform the method according to claim 1.

15. One or more devices for obtaining and associating 2D image data with 3D image data, said 3D image data being based on first intensity peak positions resulting from light triangulation performed by an imaging system comprising a first light source for illuminating a measure object with first light and an image sensor for sensing reflected first light from the measure object, wherein the light triangulation comprises to illuminate a first portion of the measure object with the first light and sense reflected first light from the first portion by the image sensor during a first exposure period resulting in a first image with first intensity peaks occurring at first sensor positions, SP1, and illuminate another, second, portion of the measure object adjacent to said first portion with the first light and sense reflected first light from the second portion by the image sensor during another, second exposure period resulting in a second image with second intensity peaks occurring at second sensor positions, SP2, and wherein the imaging system further comprises one or more additional, second, light sources for illuminating the measure object with one or more second lights, wherein said one or more devices are configured to:

illuminate the measure object with said one or more second lights and sense any reflected second light from the measure object by the image sensor during one or more third exposure periods resulting in one or more third images, select, for respective first sensor position, SP1, in the first image, a respective third sensor position, SP3, in said one or more third images and provide said illumination with the one or more second lights such that during said one or more third exposure periods, any reflected second light from the measure object will result in higher intensity than reflected first light in the selected third sensor positions, SP3, and obtain 2D image data of respective selected third sensor position, SP3, in said one or more third images and associate the obtained 2D image data with the first sensor position, SP1, that the respective selected third sensor position, SP3, was selected for, whereby the obtained 2D image data become associated with the 3D image data.

N

\* \* \* \* \*